US012049789B2

(12) United States Patent
Fox

(10) Patent No.: US 12,049,789 B2
(45) Date of Patent: Jul. 30, 2024

(54) DOWNHOLE BIPARTITE DATA TRANSMISSON ASSEMBLY

(71) Applicant: Joe Fox, Spanish Fork, UT (US)

(72) Inventor: Joe Fox, Spanish Fork, UT (US)

( * ) Notice: Subject to any disclaimer, the term of this patent is extended or adjusted under 35 U.S.C. 154(b) by 118 days.

(21) Appl. No.: 17/989,674

(22) Filed: Nov. 17, 2022

(65) Prior Publication Data

US 2023/0083926 A1 Mar. 16, 2023

(51) Int. Cl.
*E21B 17/02* (2006.01)
*E21B 17/042* (2006.01)
*H01F 38/14* (2006.01)

(52) U.S. Cl.
CPC ........ *E21B 17/0283* (2020.05); *E21B 17/042* (2013.01); *H01F 38/14* (2013.01)

(58) Field of Classification Search
CPC ............... E21B 17/0283; E21B 17/042; E21B 17/0285; E21B 17/028; E21B 17/003; H01F 38/14
See application file for complete search history.

(56) References Cited

U.S. PATENT DOCUMENTS

| | | | | | |
|---|---|---|---|---|---|
| 4,884,071 | A * | 11/1989 | Howard | E21B 47/13 | 340/870.31 |
| 4,914,433 | A * | 4/1990 | Galle | E21B 47/13 | 340/854.4 |
| 9,441,418 | B2 * | 9/2016 | Mitjans | E21B 17/028 | |
| 2005/0212530 | A1 * | 9/2005 | Hall | G01R 31/54 | 324/642 |
| 2005/0285705 | A1 * | 12/2005 | Hall | H04B 5/00 | 336/132 |
| 2008/0110638 | A1 * | 5/2008 | Hall | E21B 17/0285 | 166/381 |
| 2014/0332235 | A1 * | 11/2014 | Mueller | E21B 47/017 | 166/65.1 |

* cited by examiner

*Primary Examiner* — George S Gray

(57) ABSTRACT

A bipartite transmission coupler assembly comprising a downhole tool such as a drill pipe having an axial bore comprising a bore wall. The bore wall comprising a first annular groove open to the bore. The coupler may comprise a cylinder comprising an outside wall and an inside wall separated by top and bottom walls. The top wall comprising an annular recess configured to house a transmission assembly. The outside wall comprising a second annular groove configured to align with the first annular groove when the cylinder is installed into the axial bore. An annular spring ring may be housed within the second annular groove such that when the grooves are aligned within the axial bore, the spring ring radially expands at least partially into the first annular groove, securing the elongate cylinder within the axial bore. The cylinder may be divided into a first part and a second part.

19 Claims, 38 Drawing Sheets

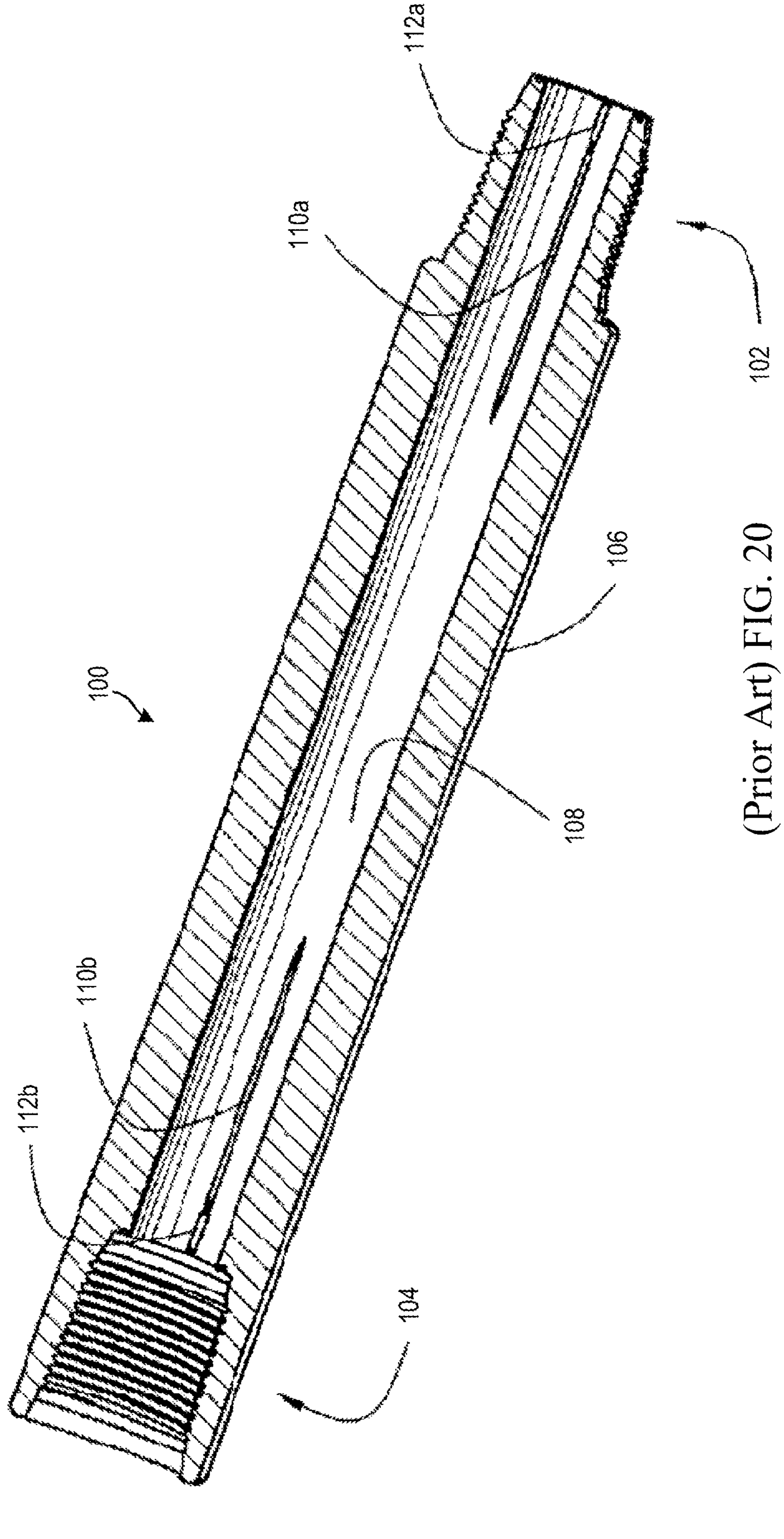
(Prior Art) FIG. 20

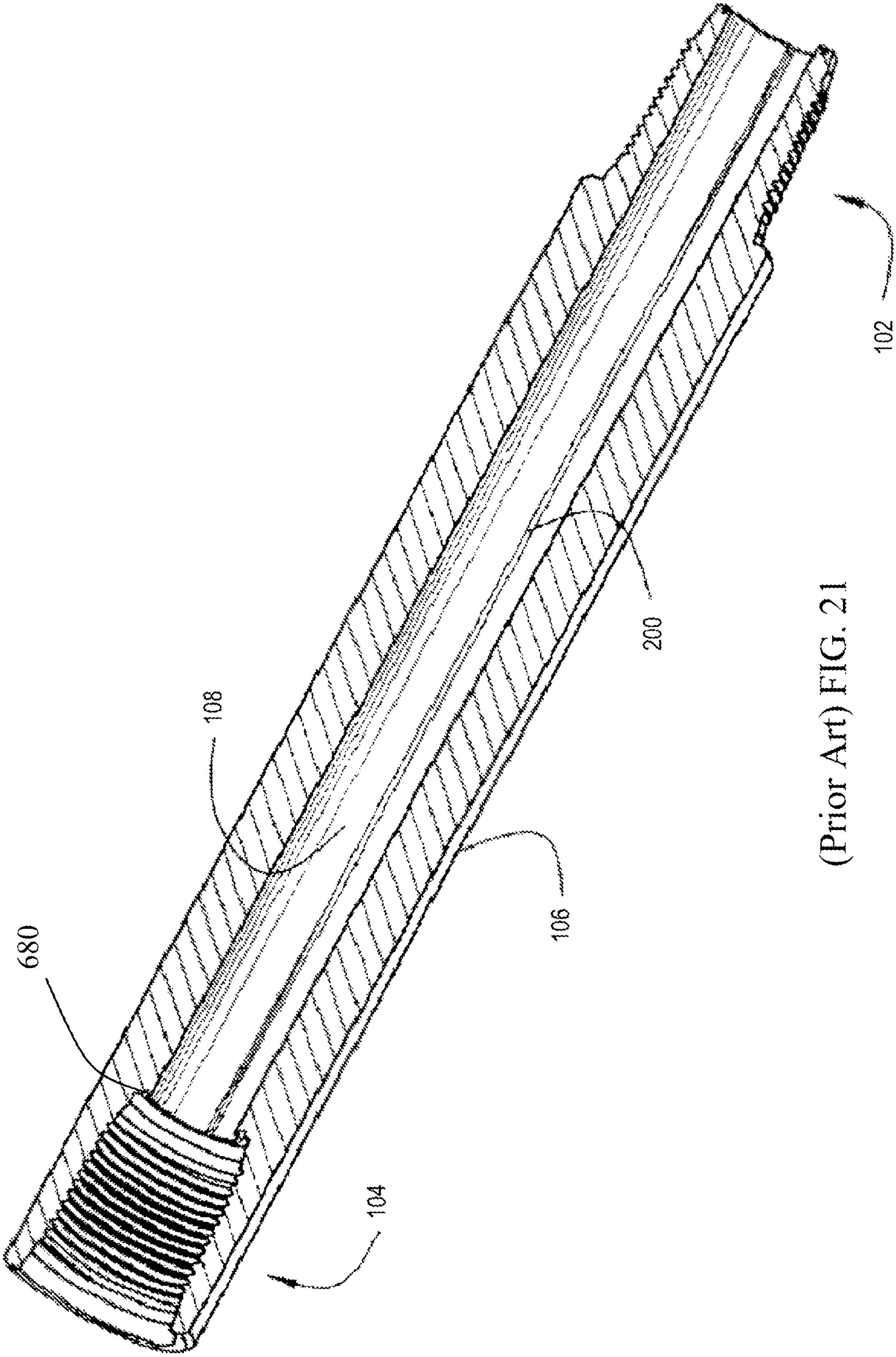
(Prior Art) FIG. 21

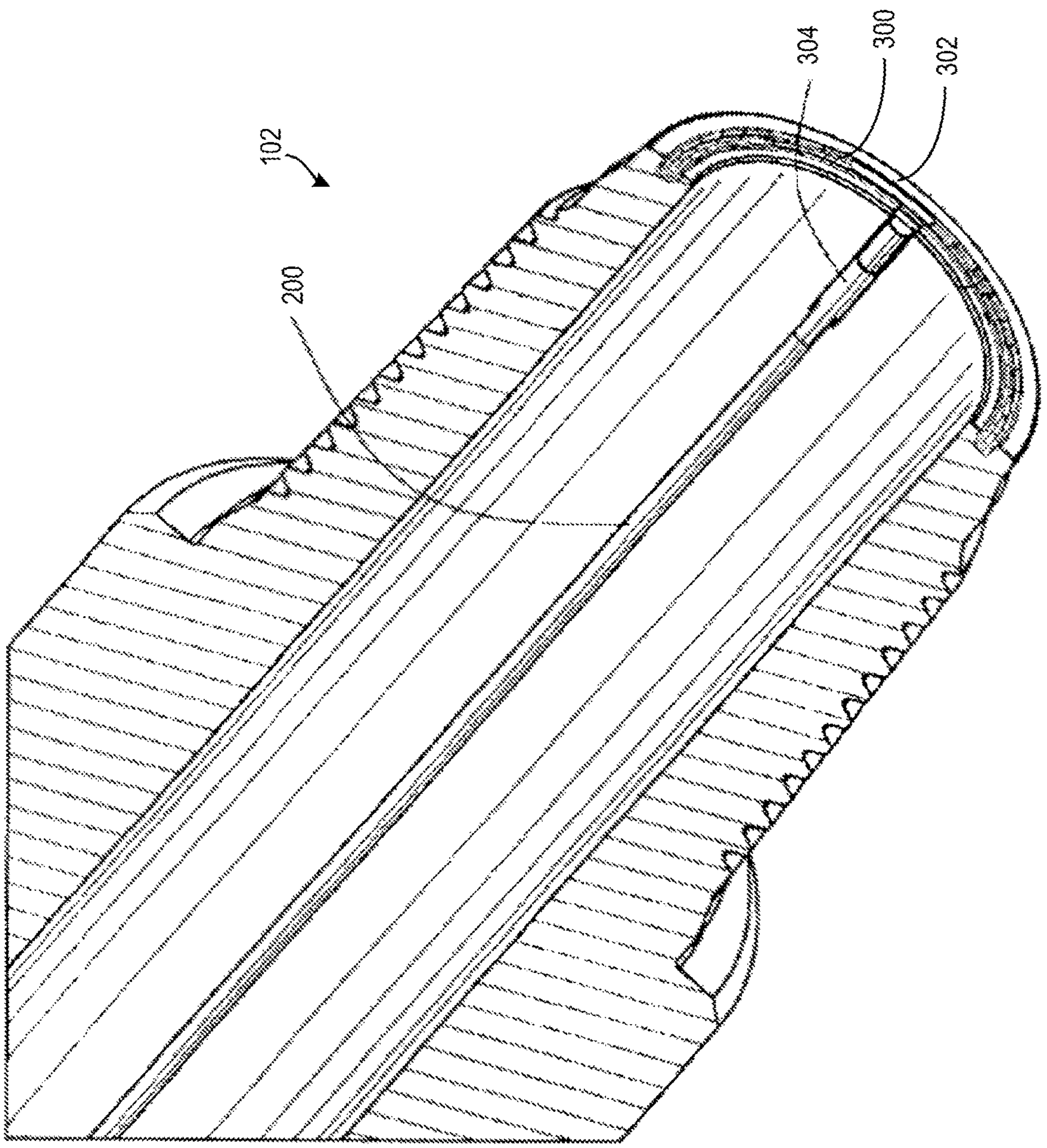
(Prior Art) FIG. 22

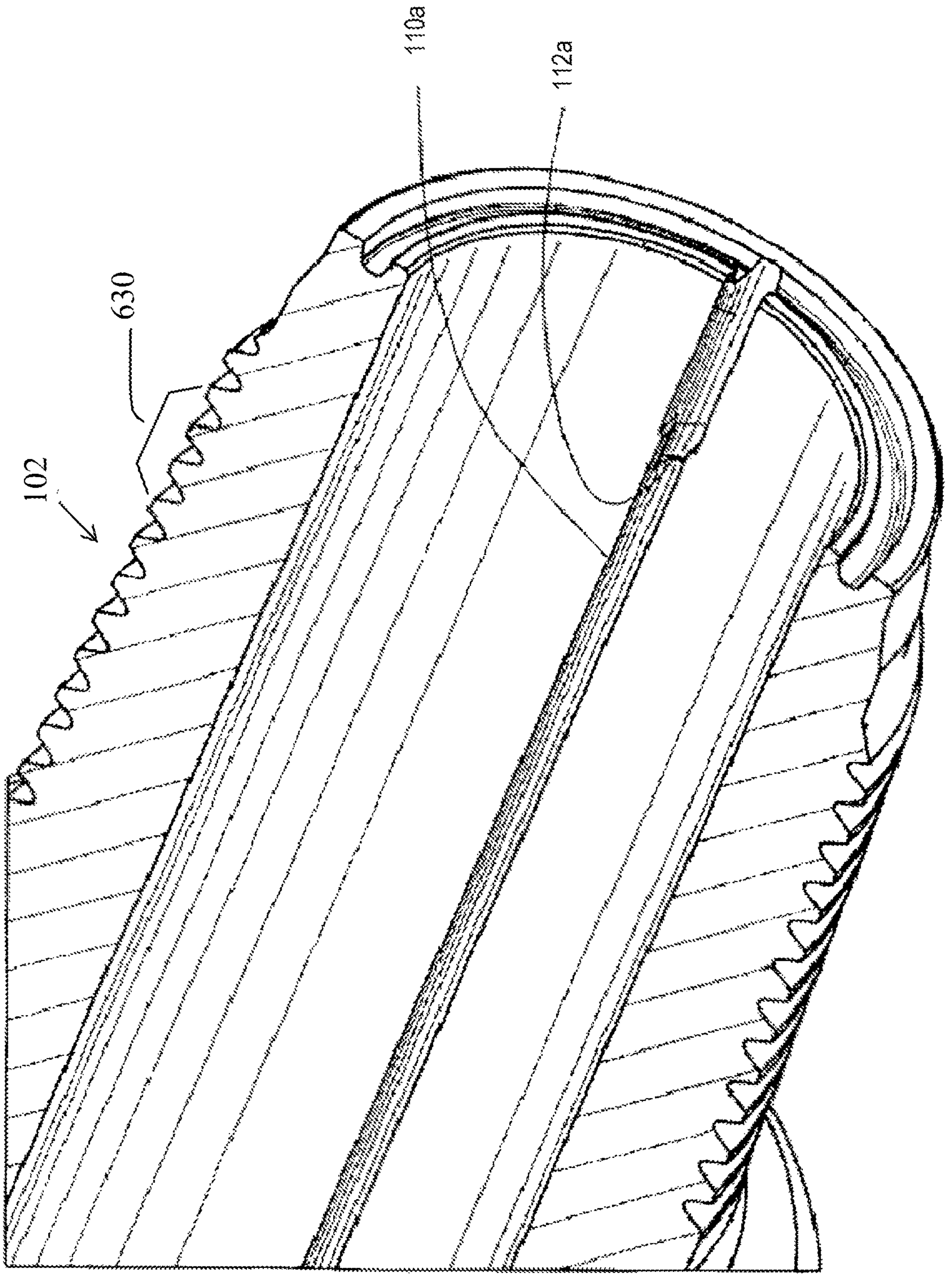
(Prior Art) FIG. 23

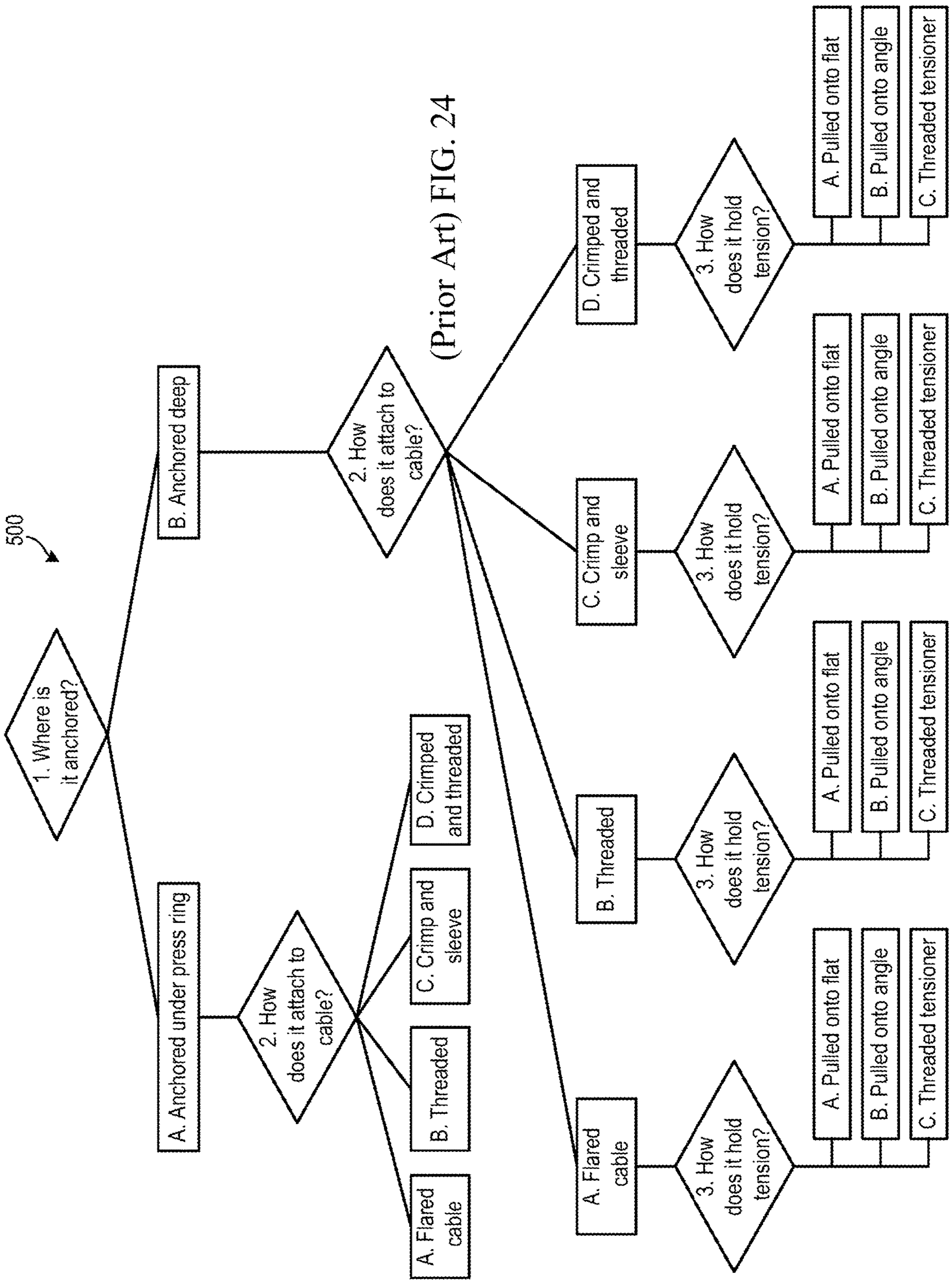
(Prior Art) FIG. 24

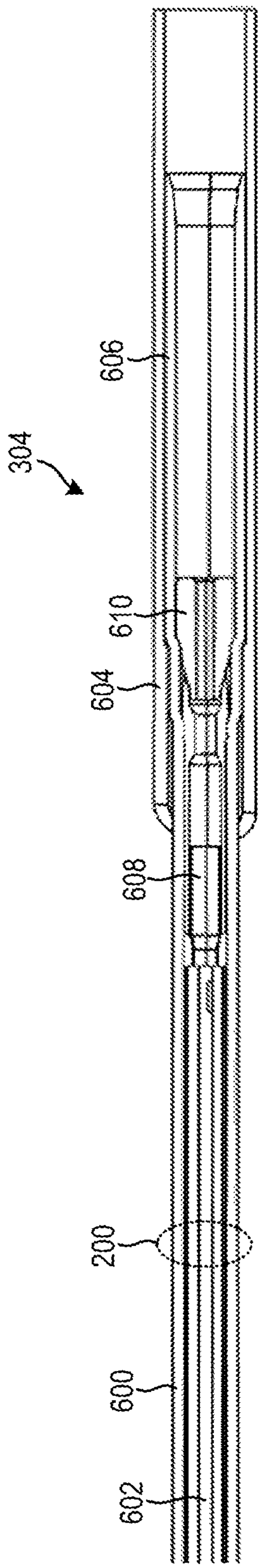
(Prior Art) FIG. 25A
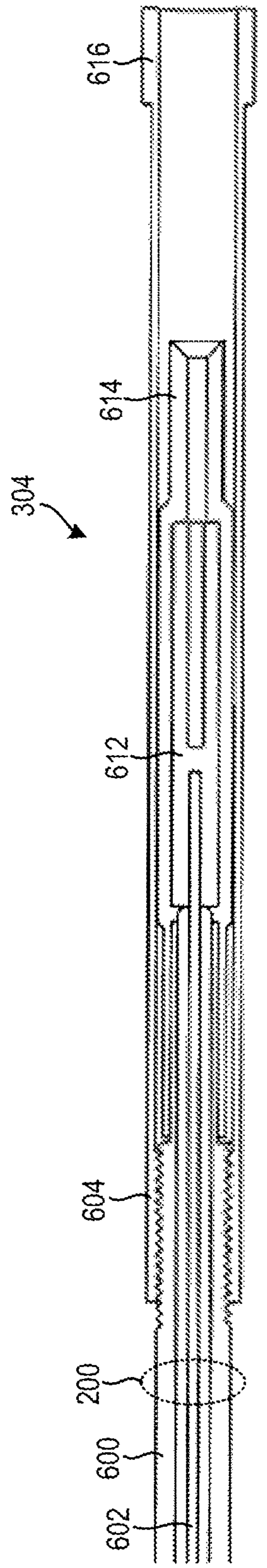
(Prior Art) FIG. 25B

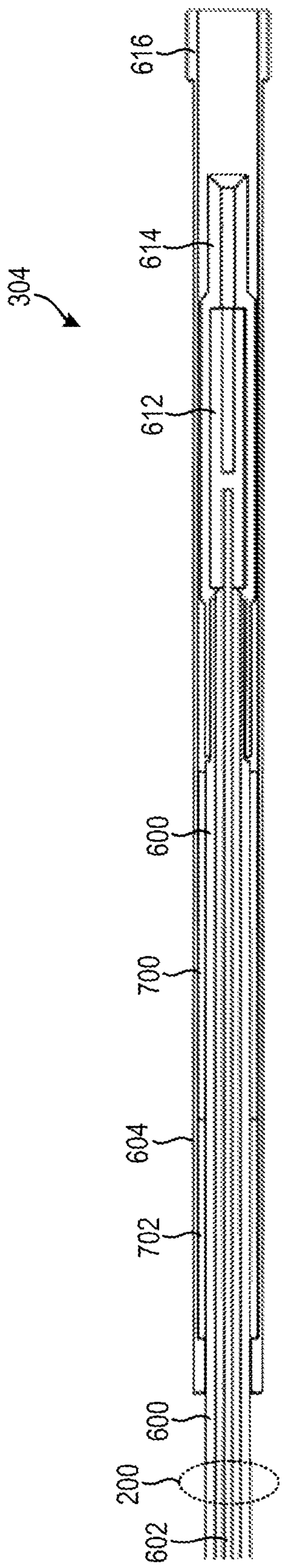
(Prior Art) FIG. 26A
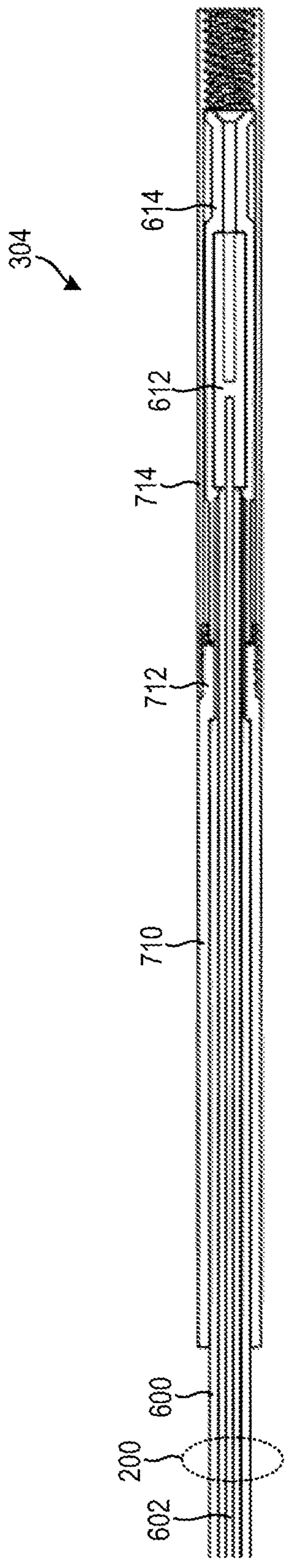
(Prior Art) FIG. 26B

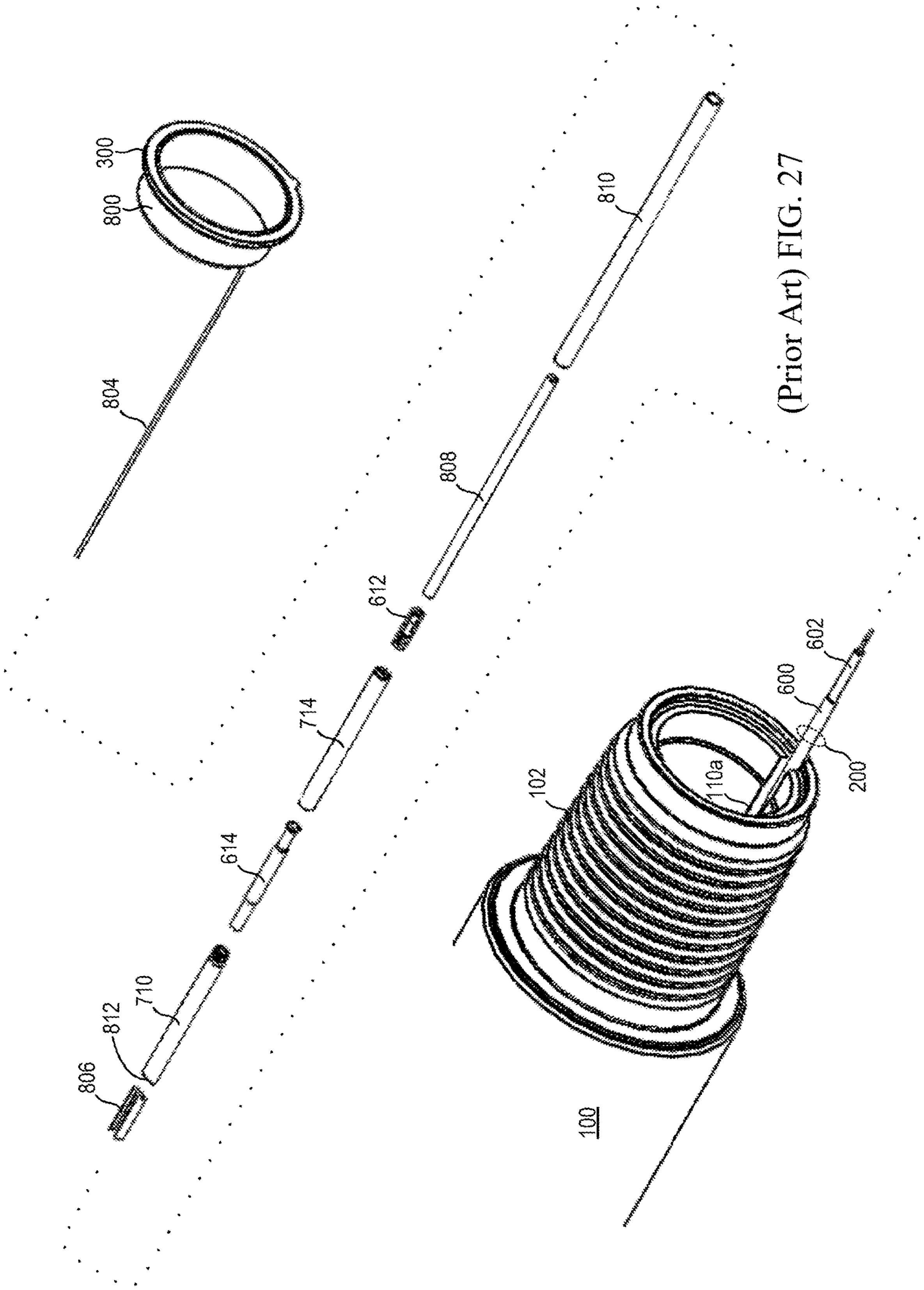
(Prior Art) FIG. 27

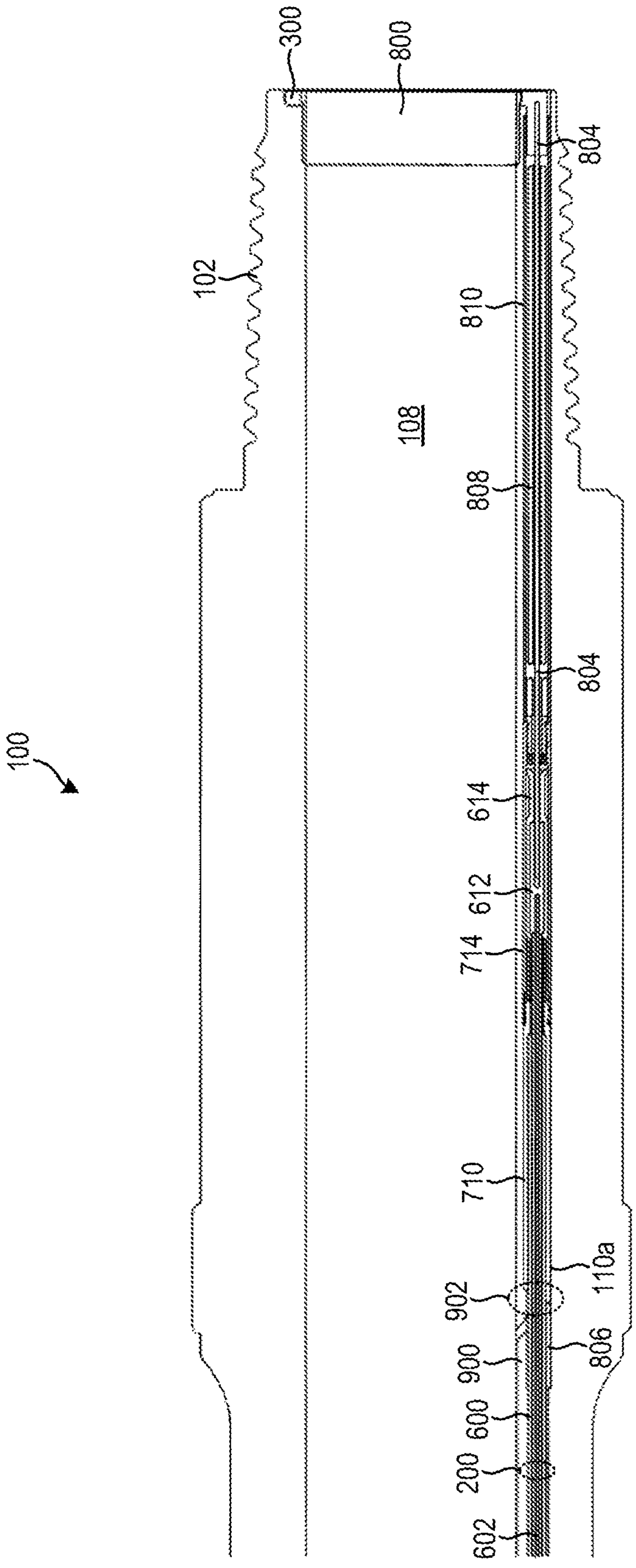
(Prior Art) FIG. 28

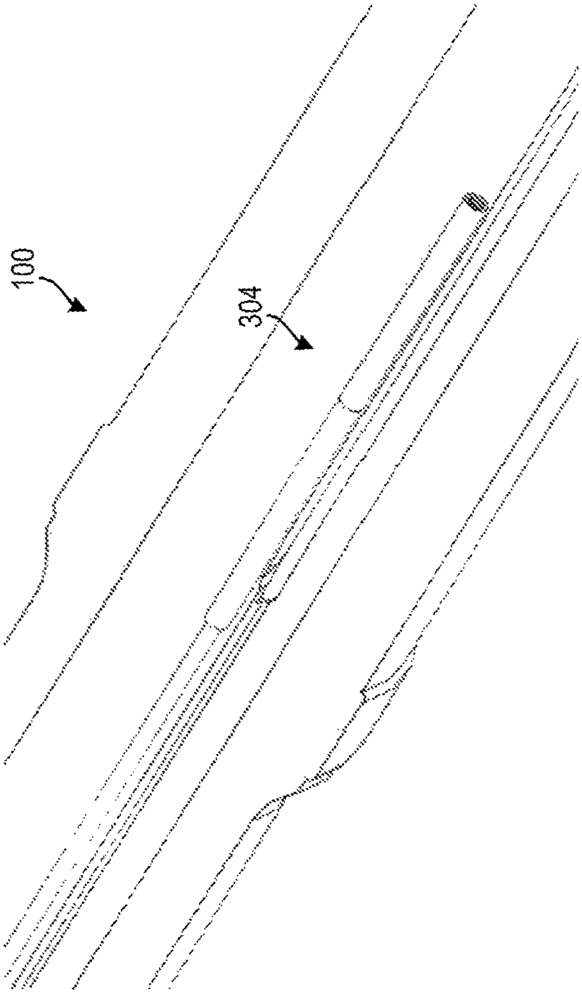
(Prior Art) FIG. 29A
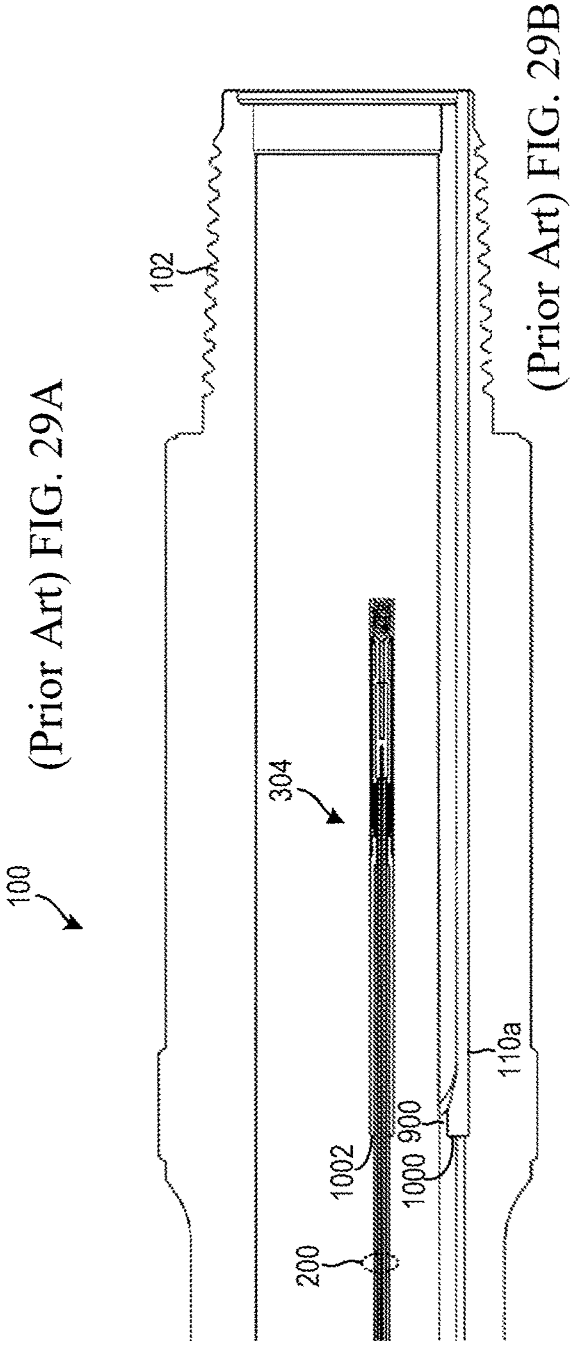
(Prior Art) FIG. 29B

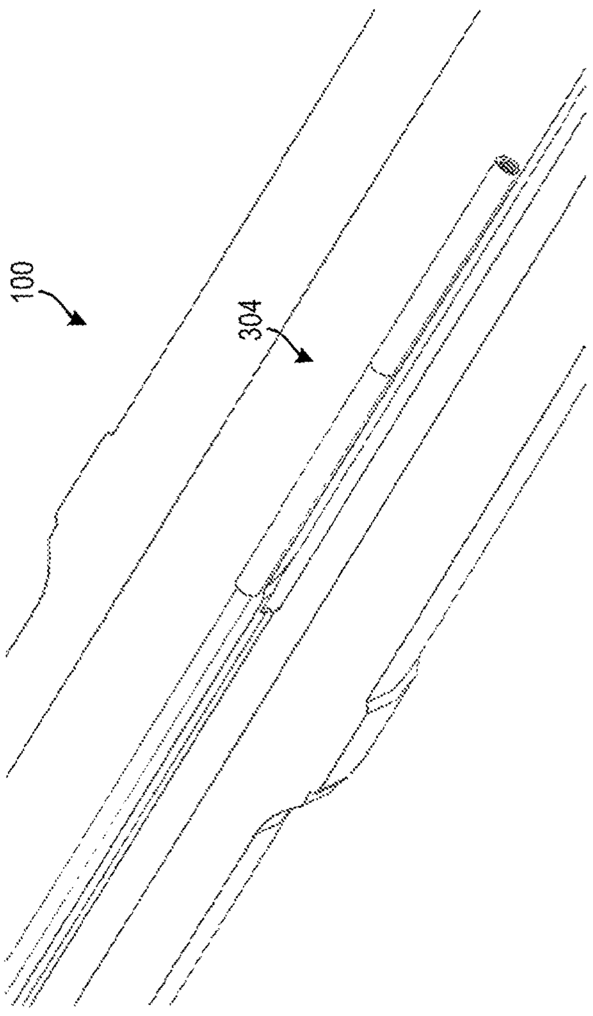
(Prior Art) FIG. 30A
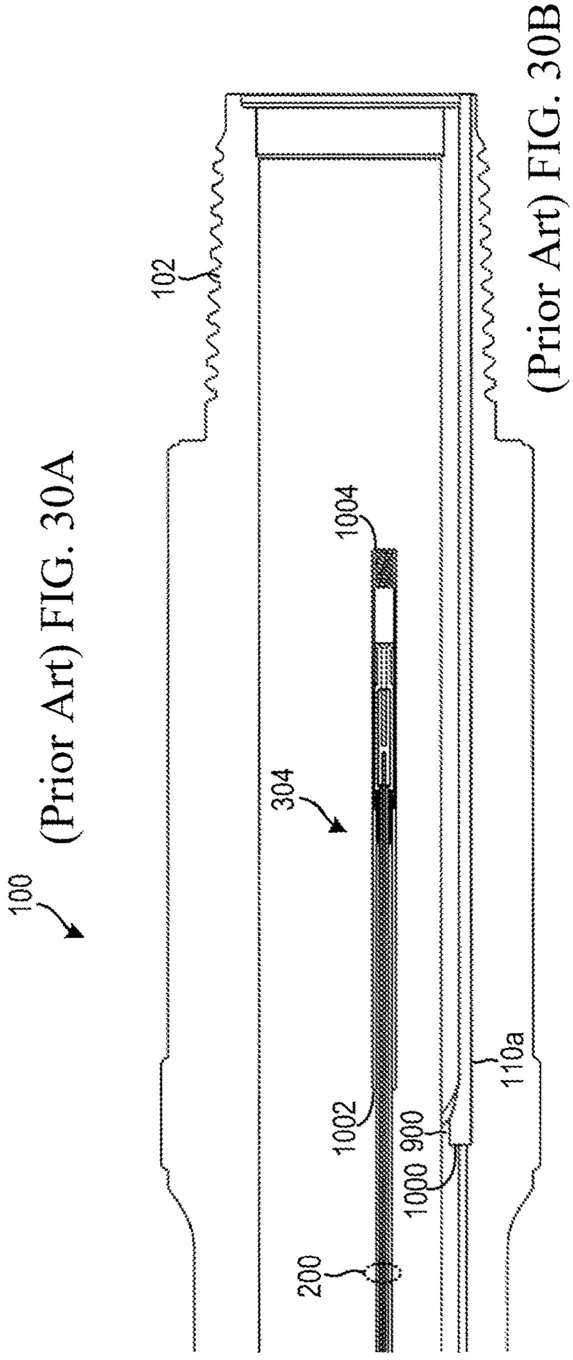
(Prior Art) FIG. 30B

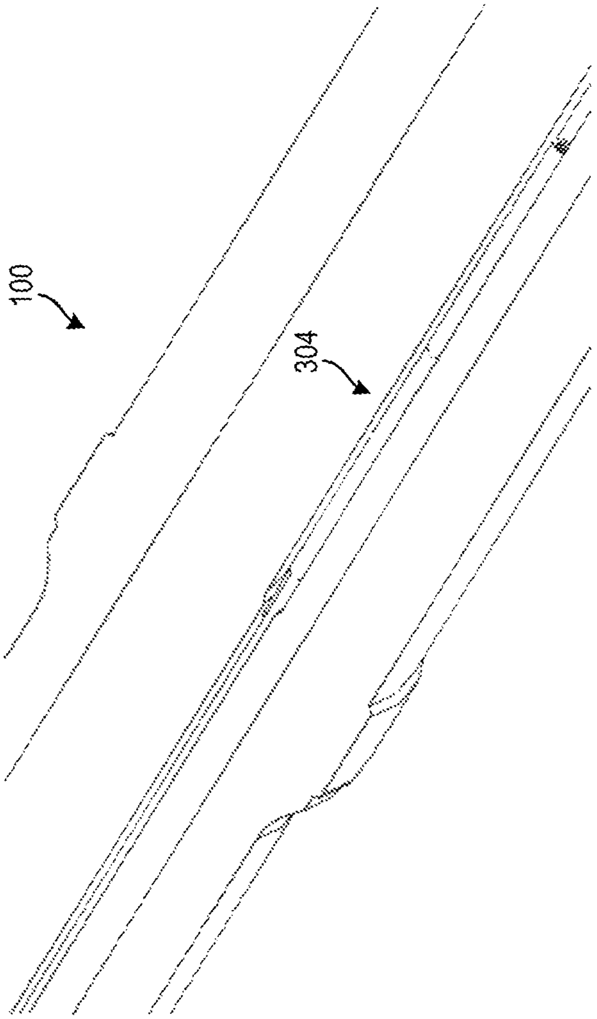
(Prior Art) FIG. 31A
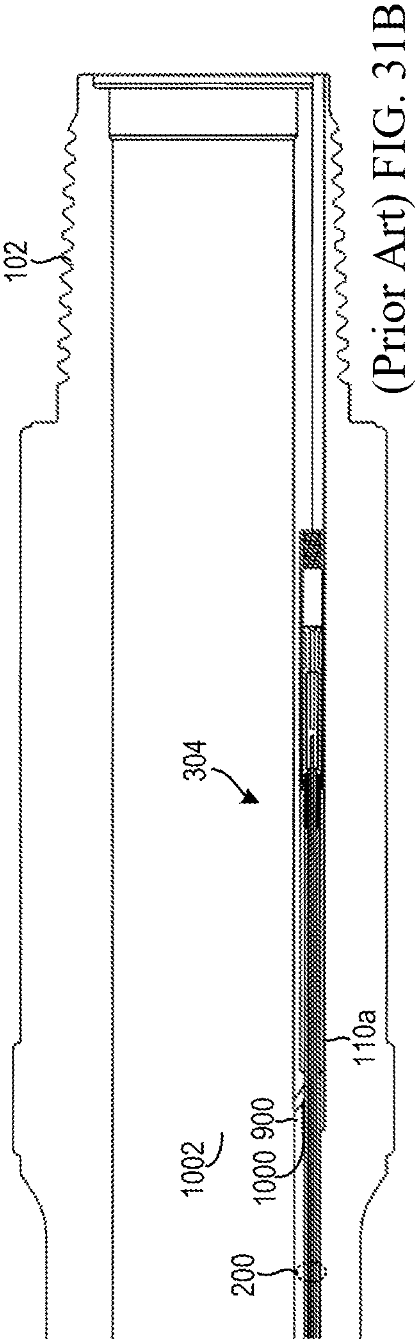
(Prior Art) FIG. 31B

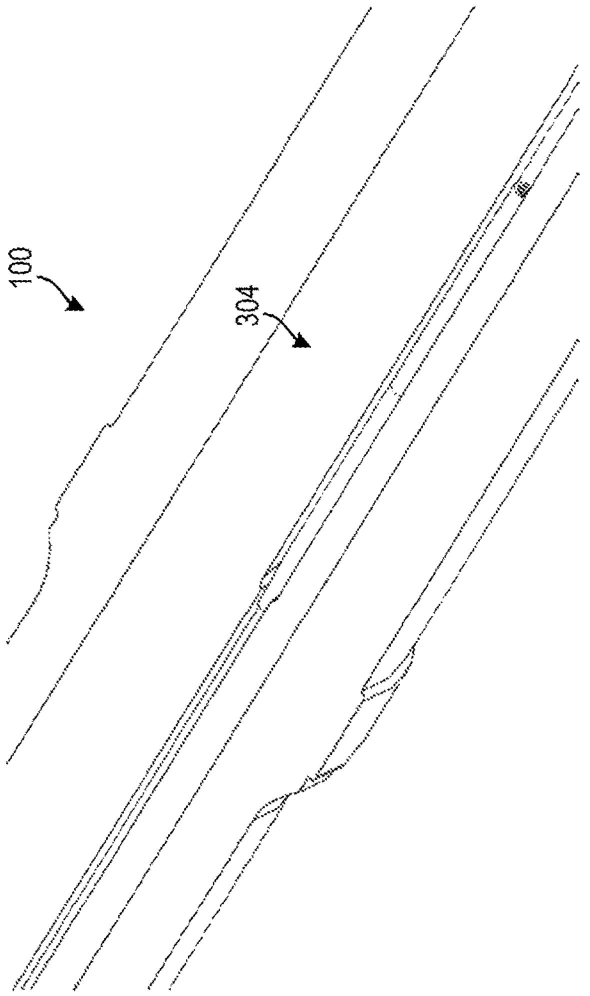
(Prior Art) FIG. 32A
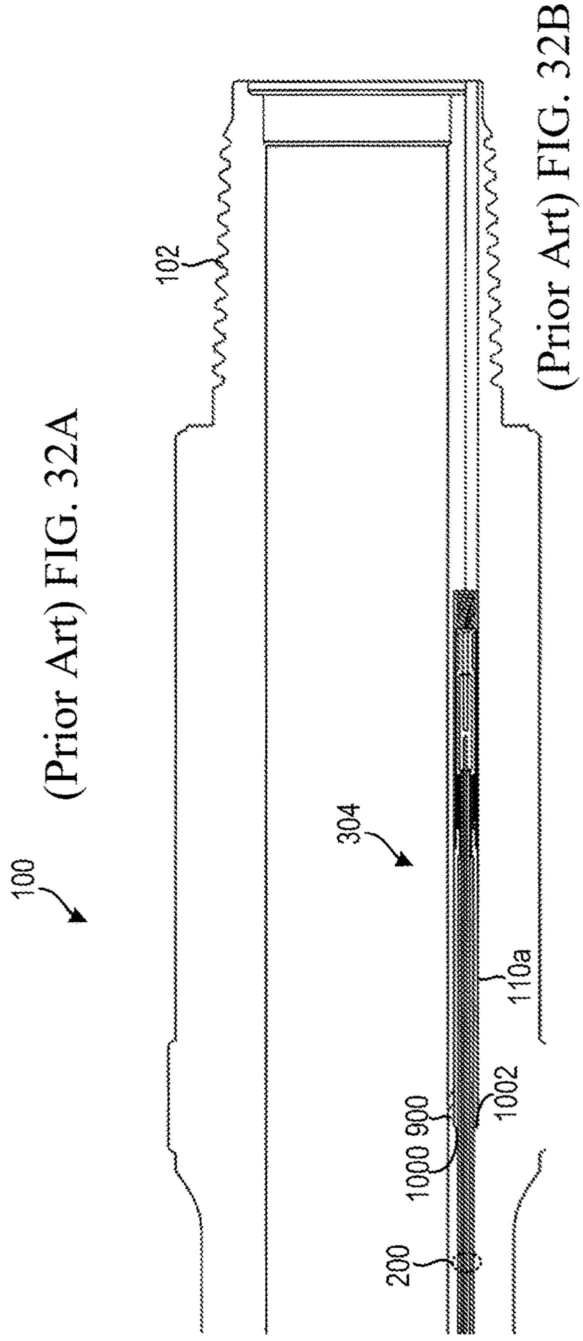
(Prior Art) FIG. 32B

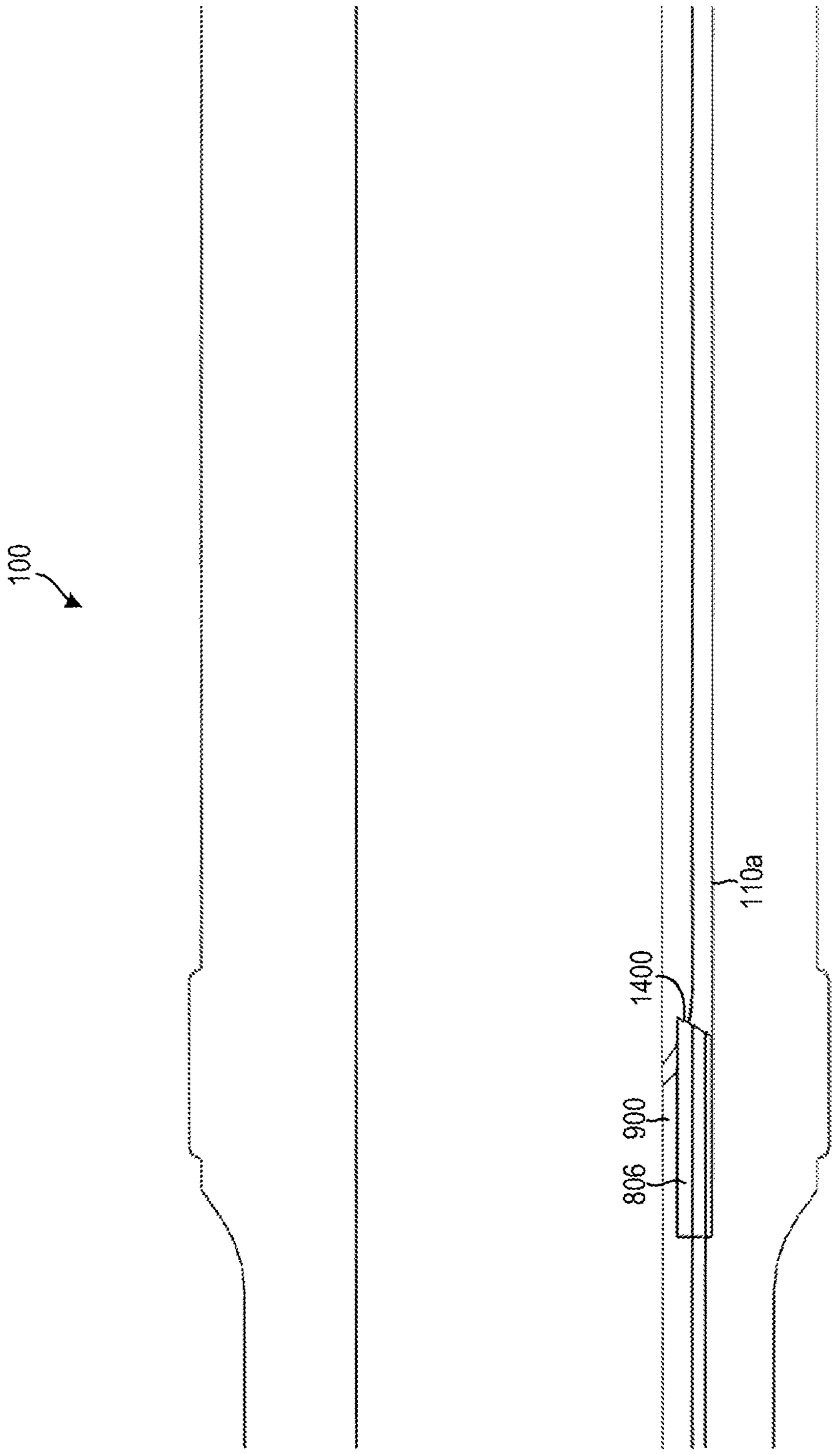
(Prior Art) FIG. 33

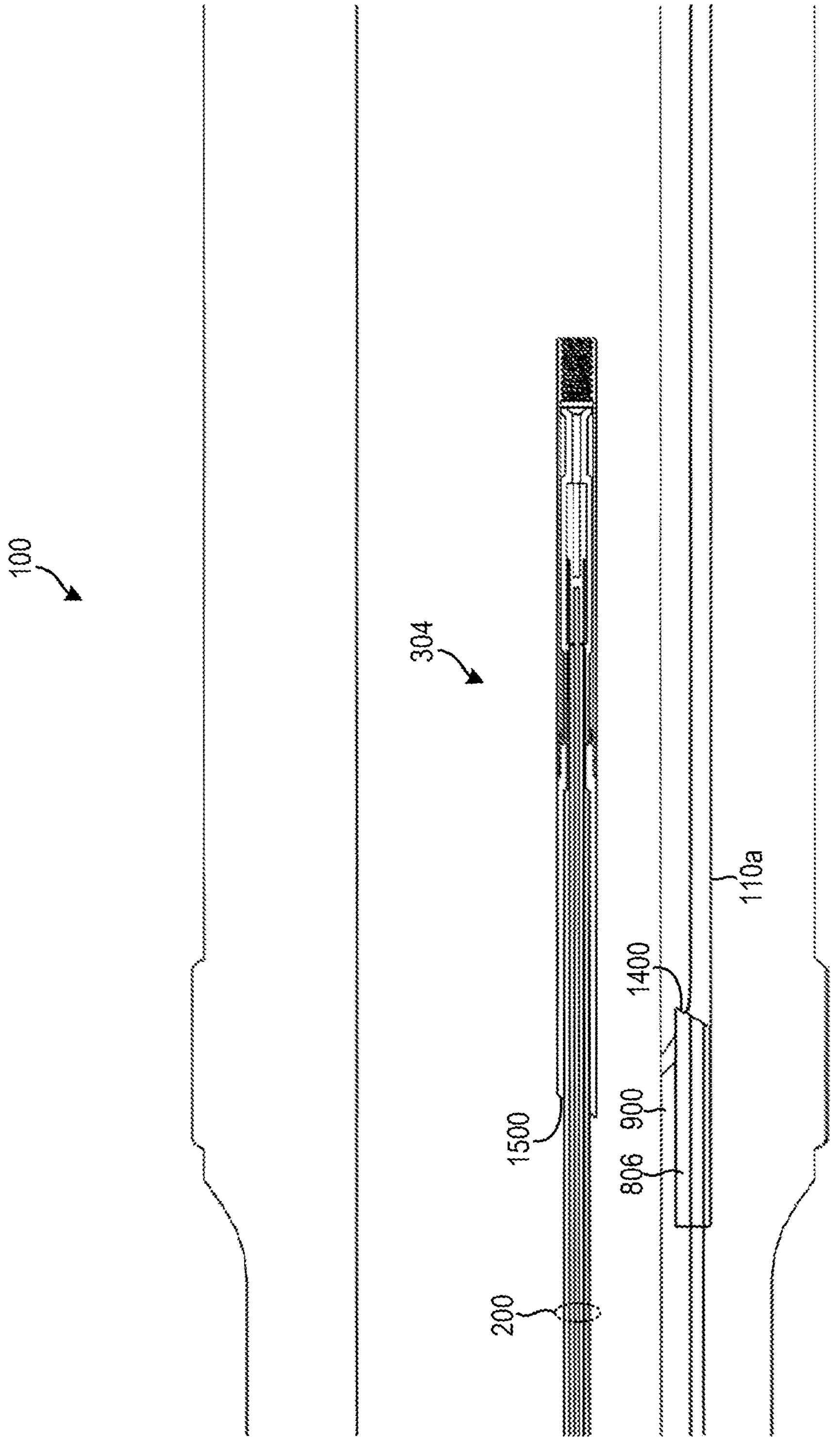
(Prior Art) FIG. 34

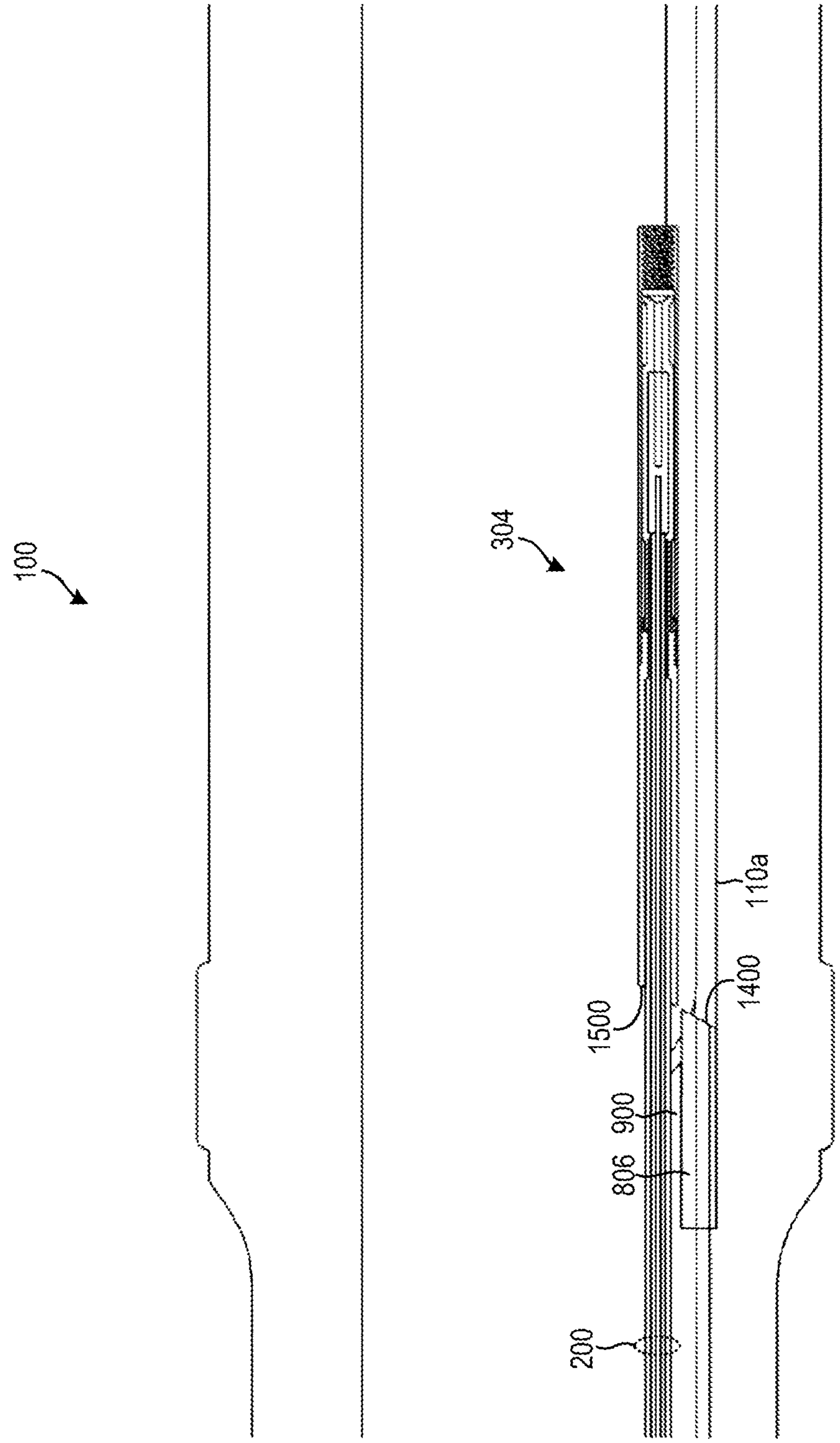
(Prior Art) FIG. 35

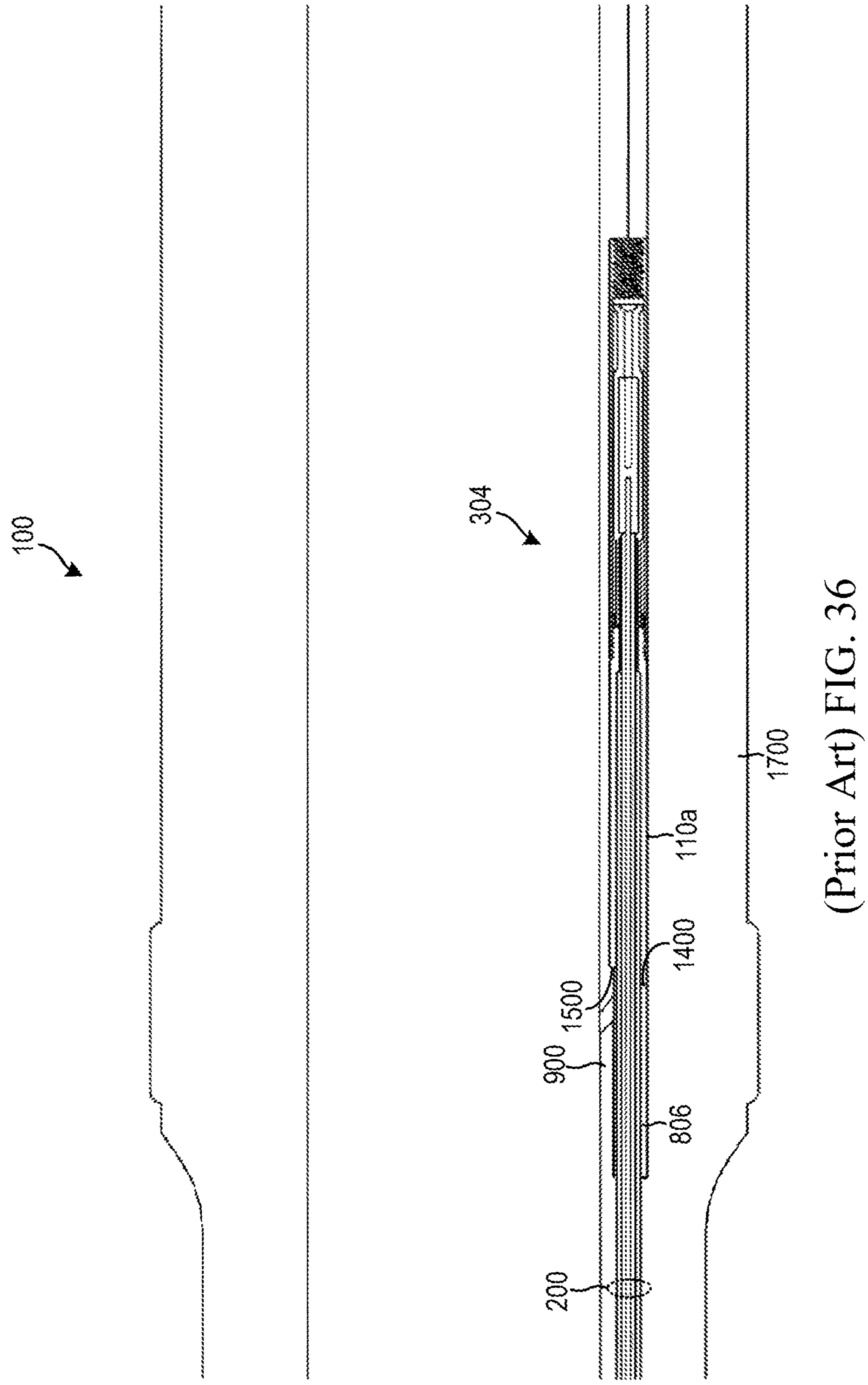
(Prior Art) FIG. 36

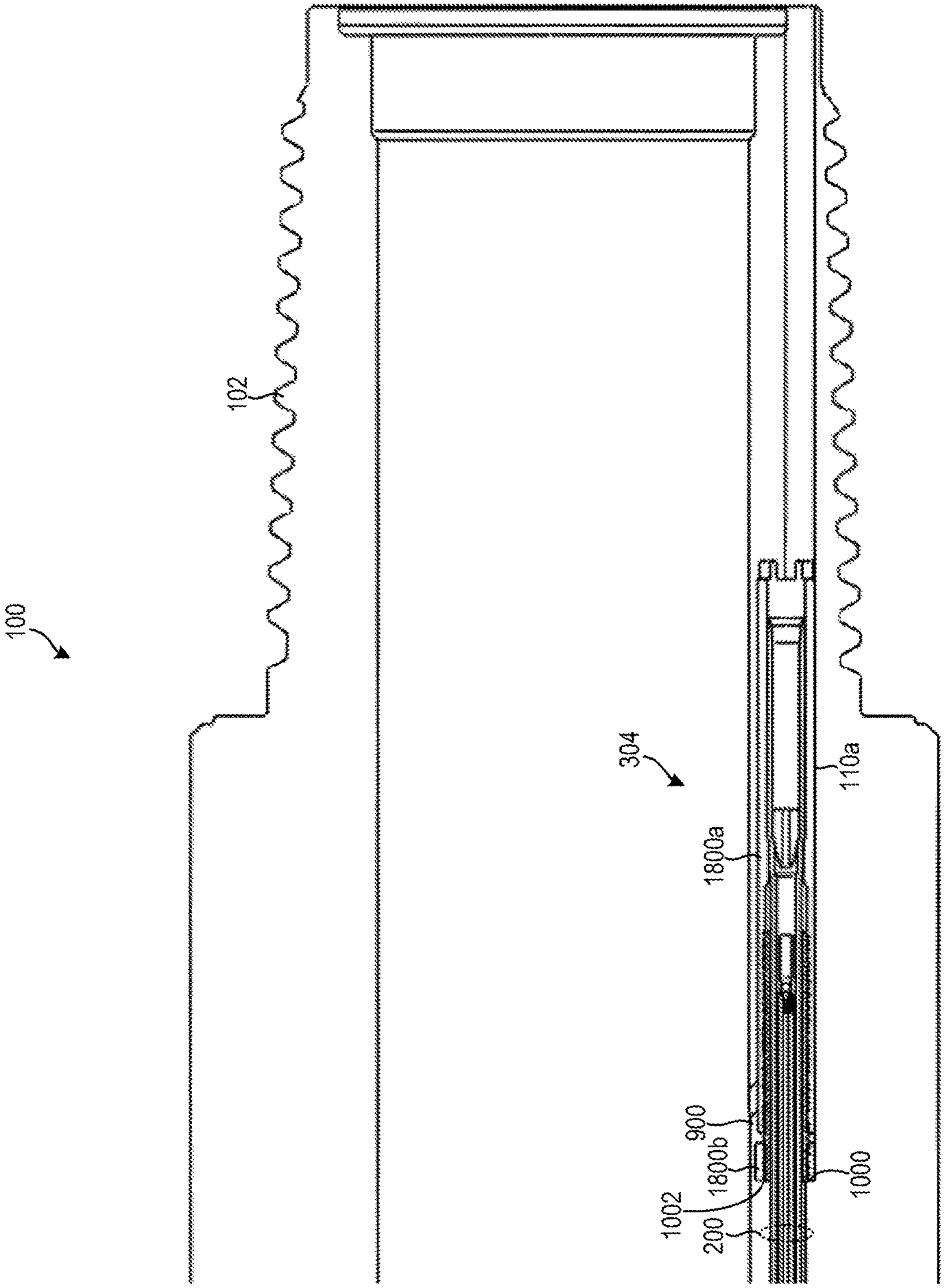
(Prior Art) FIG. 37

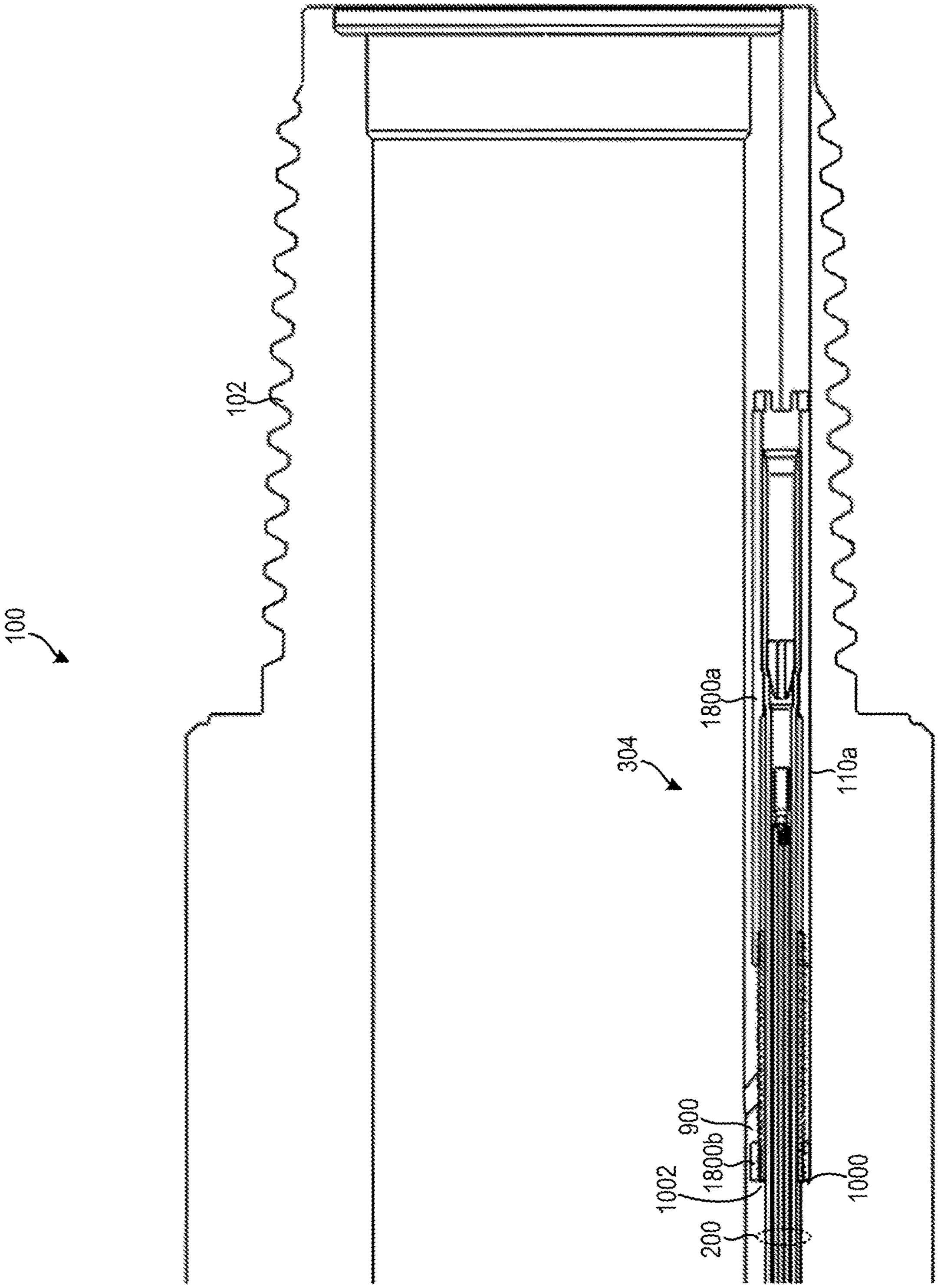
(Prior Art) FIG. 38

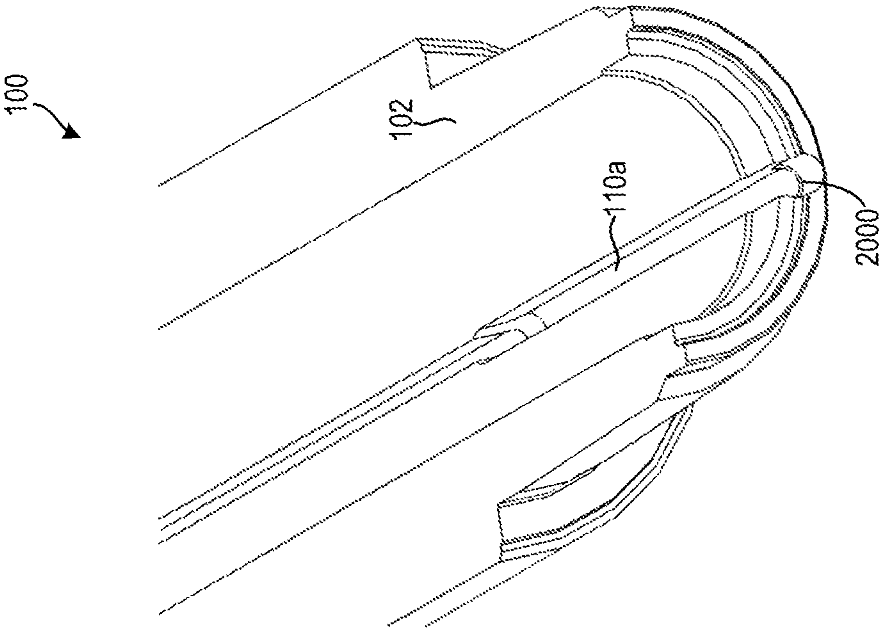
(Prior Art) FIG. 39B
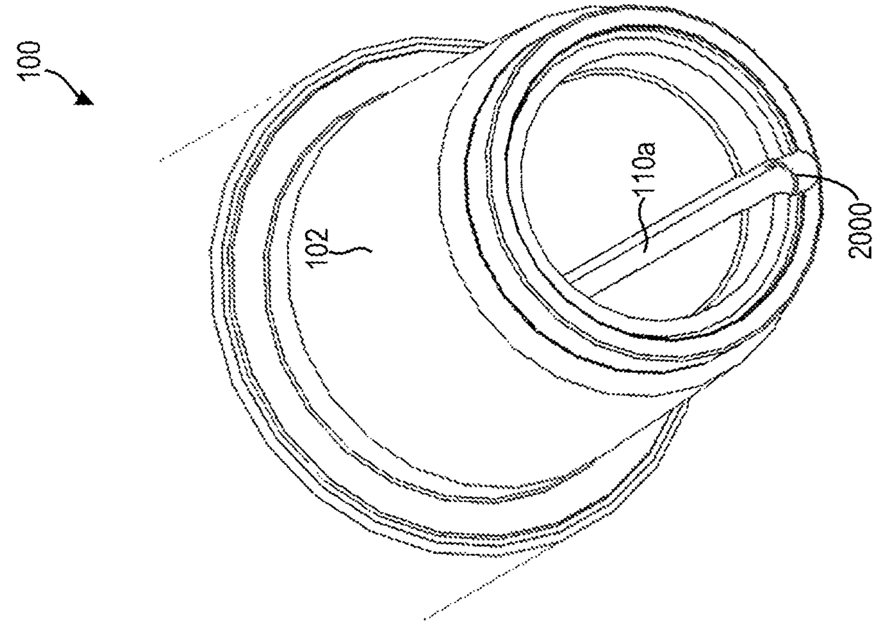
(Prior Art) FIG. 39A

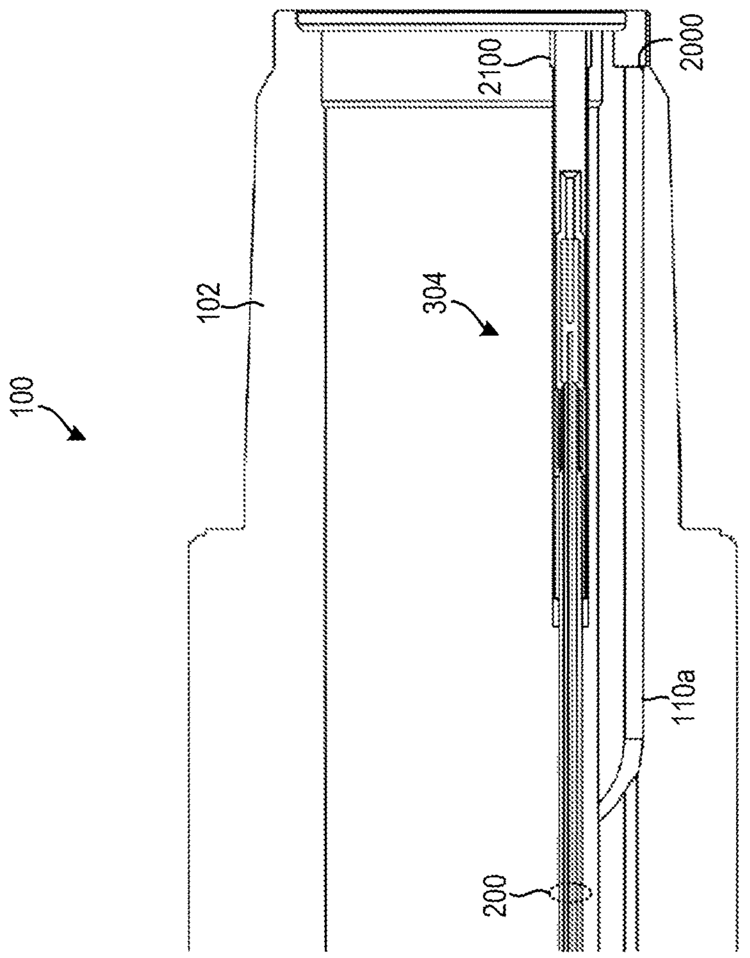
(Prior Art) FIG. 40B
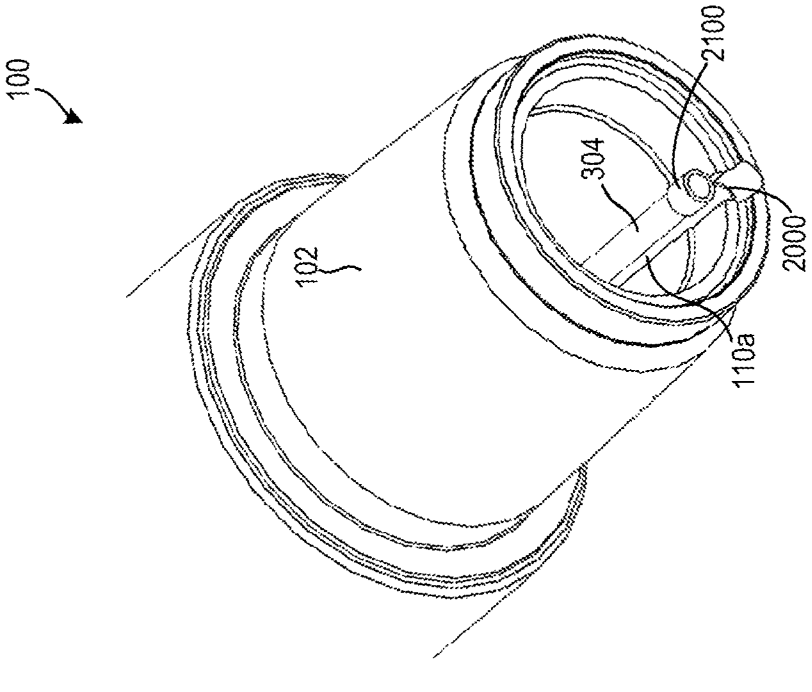
(Prior Art) FIG. 40A

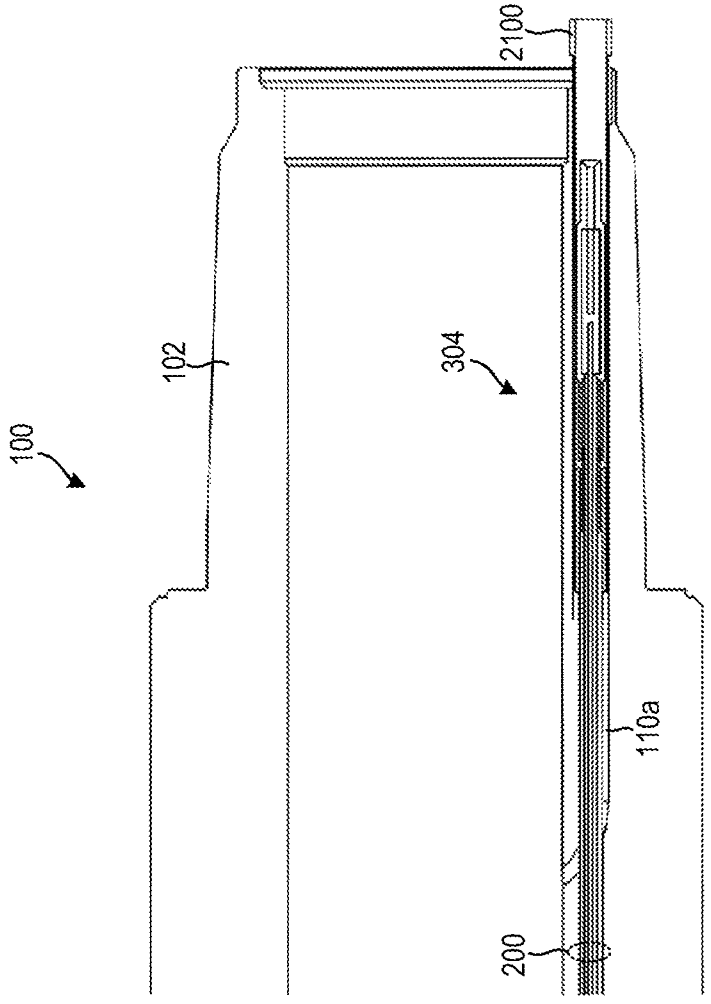
(Prior Art) FIG. 41B
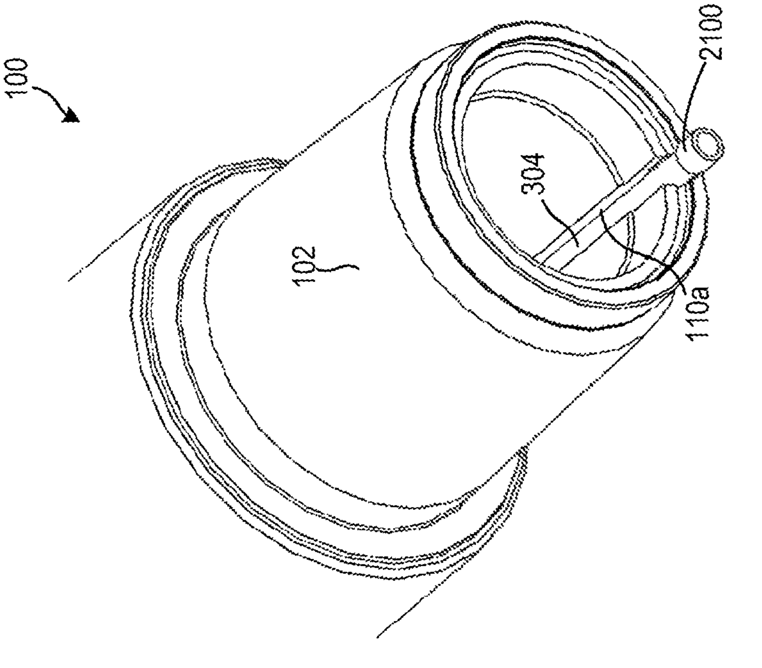
(Prior Art) FIG. 41A

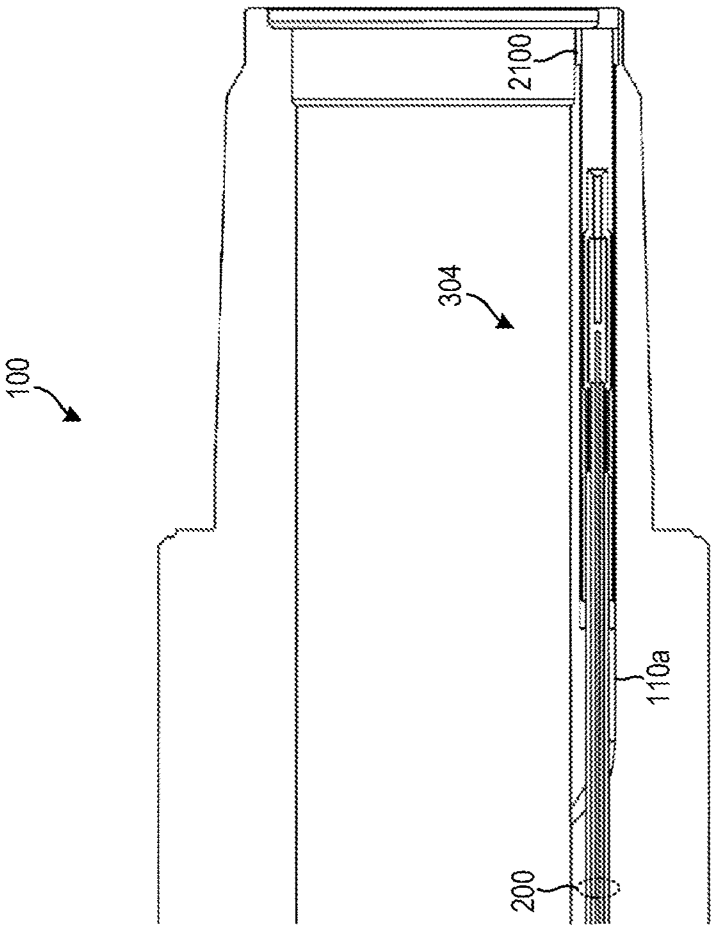
(Prior Art) FIG. 42B
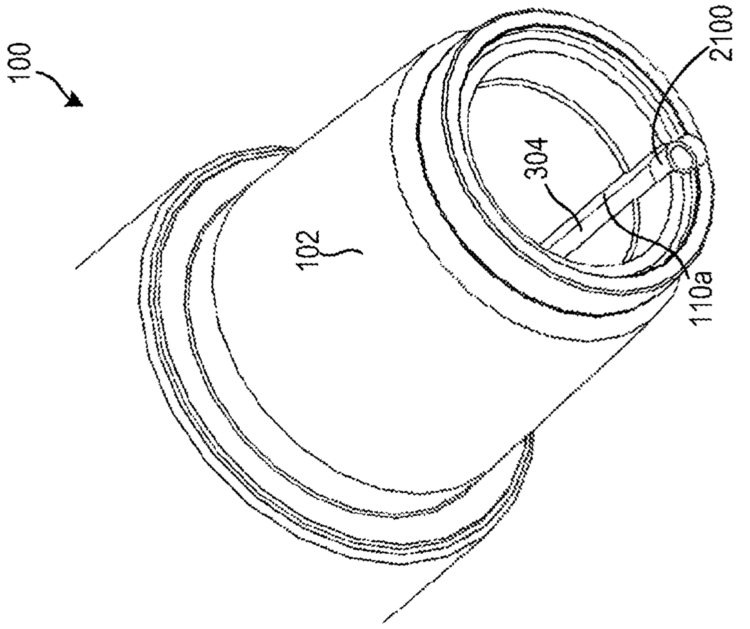
(Prior Art) FIG. 42A

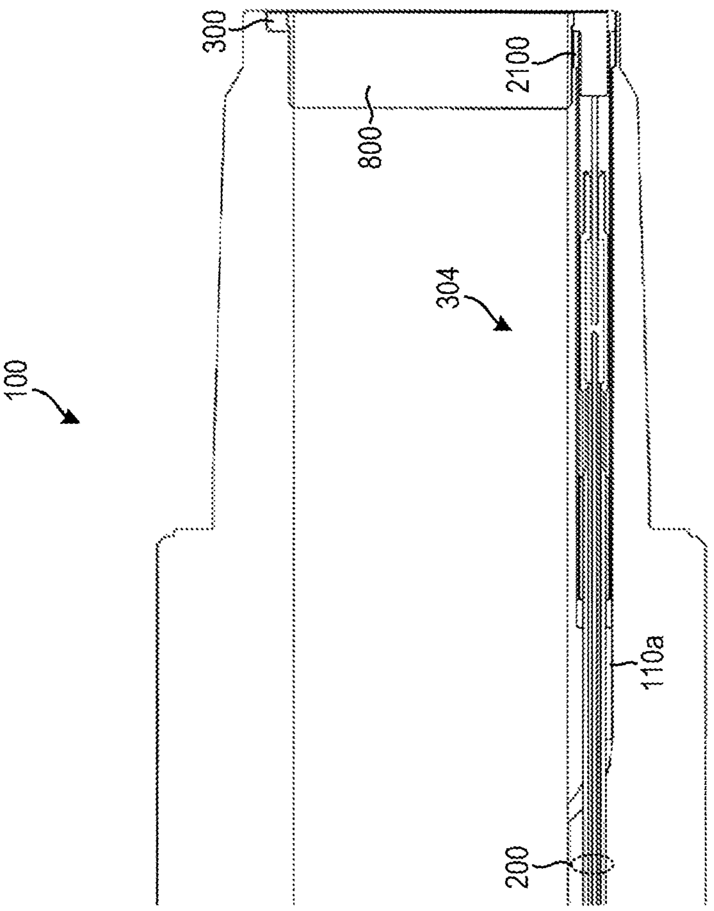
(Prior Art) FIG. 43B
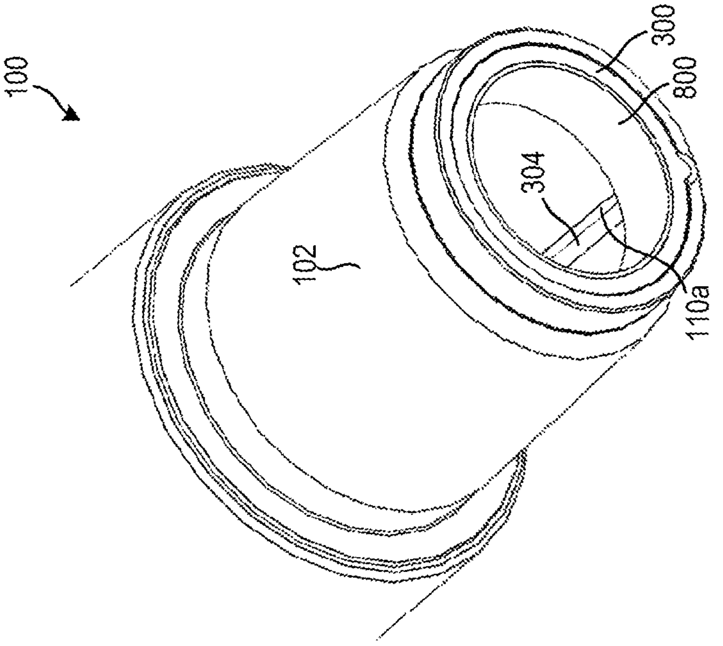
(Prior Art) FIG. 43A

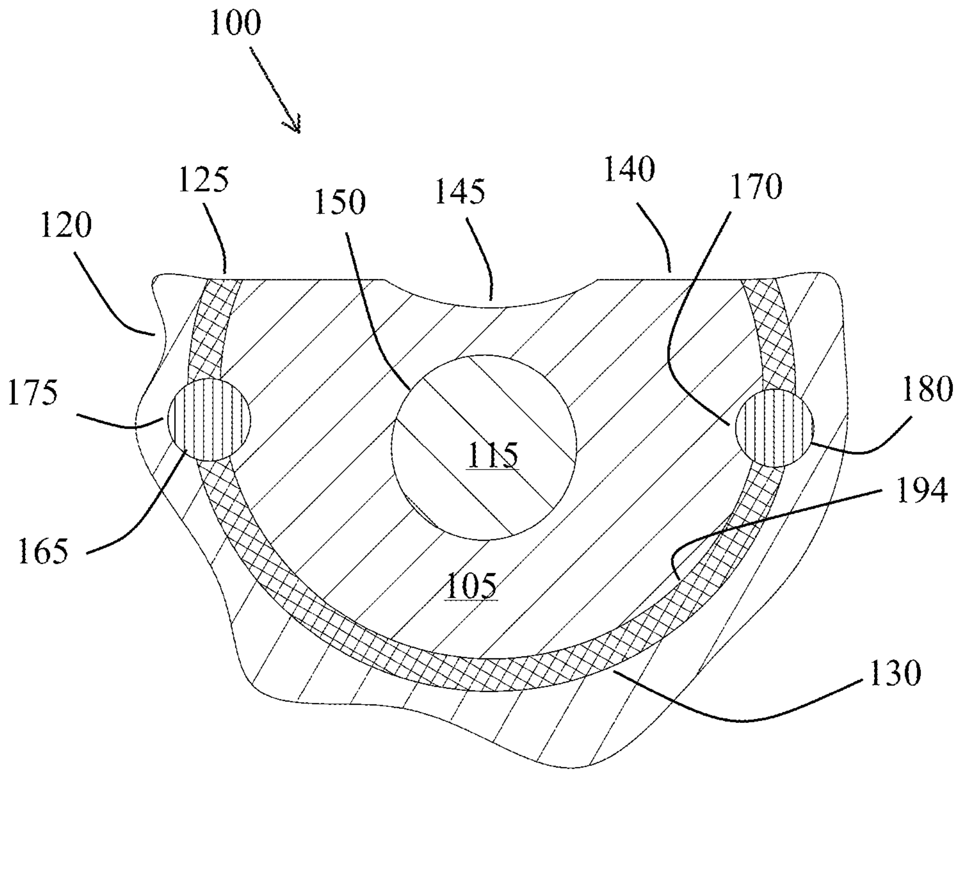
(Prior Art) FIG. 44

DOWNHOLE BIPARTITE DATA TRANSMISSON ASSEMBLY

RELATED APPLICATIONS

The present disclosure presents a modification of pending U.S. patent application Ser. No. 17/198,356, to Meier et al., entitled TRANSMISSION LINE RETENTION SLEEVE FOR DRILL STRING COMPONENTS, filed Mar. 21, 2021, incorporated herein by this reference.

U.S. patent application Ser. No. 17/893,575, to Fox, entitled A Downhole Electromagnetic Core Assembly, filed Aug. 23, 2022, is incorporated herein by this reference.

U.S. patent application Ser. No. 17/665,533, to Fox, entitled Downhole Transmission System with Perforated MCEI Segments, filed Feb. 5, 2022, is incorporated herein by this reference.

BACKGROUND

Field of the Invention

This invention relates to apparatus and methods for transmitting data and signals along a drill string.

Background of the Invention

For at least a half century, the oil and gas industry has sought to develop downhole telemetry systems that enable high-definition formation evaluation and borehole navigation while drilling in real time. The ability to transmit large amounts of sub-surface data to the surface has the potential to significantly decrease drilling costs by enabling operators to accurately direct the drill string to hydrocarbon deposits. Such information may also improve safety and reduce the environmental impacts of drilling. This technology may also be desirable to take advantage of numerous advances in the design of tools and techniques for oil and gas exploration and may be used to provide real-time access to data such as temperature, pressure, inclination, salinity, and the like, while drilling.

In order to transmit data at high speeds along a drill string, various approaches have been attempted or suggested. One approach that is currently being implemented and achieving commercial success is to incorporate data transmission lines, or wires, into drill string components to bi-directionally transmit data along the drill string. For example, drill string components may be modified to include high-speed, high-strength data cable running through the central bores of these components. In certain cases, this approach may require placing repeaters or amplifiers at selected intervals along the drill string to amplify or boost the signal as it travels along the transmission lines.

In order to implement a "wired" drill string, apparatus and methods are needed to route transmission lines or wires, such as coaxial cable, along or through the central bore of drill string components. Ideally, such apparatus and methods would be able to hold the transmission lines under tension to minimize movement of the transmission line within the central bore as well as minimize interference with tools or debris moving therethrough. Further needed are apparatus and method to seal and isolate the transmission line from drilling fluids traveling through the central bore of the drill string. Yet further needed are apparatus and methods to quickly install the transmission lines in drill string components, while minimizing the need for expensive equipment or highly trained personnel.

SUMMARY

The present application presents modifications and alterations to the '356 reference incorporated herein. The following summary description is related to FIGS. 1-19. The teachings of the '356, '533, and the '575 references apply to all FIGS. in so far as such teachings are not modified by the FIGS. 1-19.

The present application in FIGS. 1-5 discloses a bipartite transmission coupler assembly, comprising a downhole tool comprising an axial bore comprising a bore wall. The downhole tool may be a drill pipe, production tubing, heavy weight drill pipe, drill collar, riser, or drill string tool associated with the bottom hole assembly. The downhole tool may be a drill bit. Furthermore, the tool may be associated with drill rig equipment.

The axial bore wall may comprise a first annular groove open to the bore. The assembly may further comprise an elongate cylinder comprising an outside wall and an inside wall separated by a top and bottom wall. The top wall may comprise an annular recess, groove, or housing configured to house the transmission assembly 100, see (Prior Art) FIG. 44 and (Prior Art) FIG. 22, 300.

The outside wall of the elongate cylinder may comprise a second annular groove configured to align with the first annular groove when installed within the bore. An annular spring ring may be compressed within the second annular groove such that when the first annular groove and the second annular groove are aligned within the bore, the spring ring at least partially expands radially into the first annular groove, securing the elongate cylinder within the axial bore. The spring ring may comprise two or more rings mounted atop one another in such a fashion that the actual length of the elongate cylinder may vary according to the needs of the downhole tool.

The elongate cylinder may be divided into a first part comprising a first annular interfacial wall and a second part comprising a second annular interfacial wall, the first part may further comprise the annular recess and the second part may further comprise the second annular groove. The elongate cylinder may comprise additional annular parts according to the needs of the downhole tool. The configuration of the mating surfaces of respective interfacial walls may correspond with each other forming a tight seal between the respective first and second parts. The corresponding interfacial walls may promote stability of the coupler assembly within the downhole tool. The corresponding interfacial walls of the first part and the second part, or additional parts as may be desirable, may be separated by an annular gasket, or other resilient spacer, between their respective interfacial walls. The gasket, or other spacer may provide a seal between the elongate cylinder and the bore wall.

The respective interfacial walls may comprise corresponding linear configurations. In case there are more than two interfacial walls, the corresponding linear configurations may vary. The respective interfacial walls may comprise corresponding non-linear configurations. Where a gasket or other spacer is interposed between the interfacial walls, the actual configuration of the respective interfacial walls may not match, since the resiliency of the gasket or spacer may accommodate a variety of interfacial configurations.

The configuration of the corresponding interfacial walls may comprise a variety of configurations. For example, the respective interfacial walls may comprise corresponding conical configurations, or corresponding wave configurations, or corresponding groove and ridge configurations. It may be desirable that the respective interfacial walls do not correspond with each other. In such cases, the resilient material between the interfacial walls may accommodate the differences in the configurations.

The transmission coupler assembly 100, (Prior Art) FIG. 44 and (Prior Art) FIG. 22, 300, may comprise an MCEI channel housing an electrical conductor comprising a ground end and a transmission end, see also (Prior Art) FIG. 1 of the '533 reference. The transmission end may be in communication with electrical and mechanical equipment within the downhole tool. The electrical and mechanical equipment may include sensors and gauges useful in the downhole operations. The transmission end may be in communication with a transmission coupler assembly, or other device or transmission assembly, at the opposite end of the downhole tool, or a different locations along the drill string or within the bottom hole assembly. The transmission coupler may be in communication with the drill bit.

The MCEI channel may be embedded within an annular polymeric block comprising MCEI particles, see the '533 reference. The MCEI channel may be perforated, see the '533 reference, to provide a passageway for the respective ends of the electrical conductor to exit the channel.

The axial bore wall may be within a threaded pin end tool joint 102 of a drill pipe 100, see (Prior Art) FIG. 23. The first annular groove may be located in the axial bore wall opposite threads 2 through 5, 630 (Prior Art) FIG. 23 of the pin end tool joint 102. The axial bore wall may be adjacent an internal shoulder 680, see (Prior Art) FIG. 21, within a threaded box end tool joint 104 of a drill pipe 100. The first annular groove may be located within the axial bore wall of the threaded box end tool joint 104 between 0.75 and 5.5 inches from the internal shoulder.

The elongate cylinder may comprise one or more annular seals between the outside wall of the cylinder and the axial bore wall. The seals may be made from a polymer or and metal. The annular seals may serve to seal out pressure and contaminants from the downhole environment.

The elongate cylinder may be assembled with a press fit into the axial bore. The press fit may vary from light to heavy depending on the requirements of the downhole tool. Alternatively, the elongate cylinder may be assembled with only a slip fit. The second part of the bipartite cylinder may be press fit into the axial bore, while the first part may be slip fit into the axial bore proximate the second part. It may be desirable to remove the first part without disturbing the second part.

The present application further in FIGS. 6-19 discloses a resilient conductor for an inductive coupler assembly that may comprise an inductive coupler housing comprising an annular recess. A magnetically conductive electrically insulating, MCEI, channel may be located within the recess. A flat or planar electrically conductive wire loop may be located within the MCEI channel, the loop may comprise a first end and a second end. The first end may be configured for connection to a transmission line and the second end may be configured for attachment to ground within the inductive coupler assembly. The wire loop may comprise one or more helical segments between the first end and the second end, each segment may comprise a plurality of turns. The channel may comprise an electrically nonconductive filler to aid in isolating the conductor.

The inductive coupler housing may comprise a cylinder comprising an annular exterior side wall and an annular interior side wall joining an annular top wall and annular bottom wall. The annular recess may be open to the top wall between the exterior side wall and the interior wide wall. The exterior side wall may comprise an annular recess that may comprise an annular step0 joining the exterior side wall and the top wall.

The first and second ends of the loop may comprise a hardness greater than the hardness of the loop. The annular recess may comprise a electrically nonconductive filler. The walls of the annular recess may comprise a hardness greater than the hardness of the cylindrical housing.

The electrically conductive wire loop may be insulated.

The MCEI channel may be embedded within an MCEI core, see (Prior Art) FIG. 44. The MCEI channel may comprise a plurality of MCEI segments, per the '575 reference. The MCEI channel may be housed within a mesh casing, 125, (Prior Art) FIG. 44, as disclosed in the '575 reference.

The transmission line may be connected to an electrically conductive loop as disclosed herein within a like MCEI channel within a downhole tool. Also, the transmission line may be connected to an electrical conductor within an MCEI channel of a different configuration within a downhole tool or to other tools and sensors within the downhole tool.

The inductive coupler housing may be mounted within the bore of a downhole tool joint or downhole tool. The inductive coupler housing may be mounted onto a split ring protruding from a groove in a bore wall of a downhole tool or joint. Mounting the housing on the ring within the bore of a downhole tool, such as a drill pipe etc., may be preferable to mounting the housing onto a shoulder within the bore because the groove may be easier to manufacture and less likely to negatively affect the integrity of the downhole tool under downhole conditions. For example, forming the shoulder within the bore of a tool may require counter boring the bore, thus thinning the side wall of the downhole tool where the side wall may already be susceptible to failure under extreme conditions. On the other hand, forming a groove may remove less material from side wall and the groove may be located where the side wall is thicker so as not to negatively impact the integrity of the side wall under the stresses associated with downhole operations. The inductive coupler housing may be press fit within the bore of a tool joint, or downhole tool, the press fit may comprise a range from a light press fit to a hard press fit. The inductive coupler housing may be slip fit within the bore of the tool joint, or downhole tool. A slip fit may be adequate for the housing since the housing may not be tied to the primary and secondary shoulders in the drill pipe and the housing may not experience the torque and compressive forces normally experienced by the primary and secondary shoulders of the drill pipe during joint makeup and other drill pipe operations.

The helical segments along the resilient conductor may be spaced apart along the electrically conductive loop. The segments may add resilience to the loop. The helical segments may comprise substantially vertical loops; the orientation of the loops may range from horizontal to vertical. The helical segments may be formed within the loop itself or the segments may be attached to the loop after manufacture. The segments may be arranged along the loop in series or in parallel.

Additionally, a tool string electrical transmission line housing is disclosed that may comprise a cylinder adapted for mounting within a bore of a tool string component. The cylinder may also comprise a slit cylinder. The cylinder may be disposed on or adjacent to a shoulder within the bore. The cylinder may be positioned atop a split spring ring housed within a groove in the bore wall of the component. The spring ring may be compressed for insertion and then released within the groove. The cylinder may comprise an inside axial side wall spaced apart from an outside axial side wall 380, the respective side walls joining top and bottom surfaces.

The outside axial side wall may comprise an axial channel that is open to the outside axial side wall. The channel may be aligned within the split of the ring. The split may allow passage of the transmission line into the axial channel The outside axial channel may intersect the bottom surface and a housing open to the outside axial side wall and open to the top surface. An anti-rotation lock may be disposed on the top surface, between the cylinder outside side wall and the component bore wall The lock may prevent the cylinder from movement within the bore.

An extractor housing may be formed within the top surface. The extractor housing may comprise an open recess or a tapped or a threaded opening within the surface. An extractor may reside within the housing. The extractor may comprise an eye bolt, strap, threaded opening, threads, hook, or a groove, or a combination thereof, to facilitate the removal of the cylinder. The housing or tapped or threaded opening may be provided with a replaceable, sacrificial cover. The sacrificial cover may be breached to access the extractor to allow removal of the cylinder. The cover may prevent contamination from entering the housing or opening and interfering with the extractor. Removal of the cylinder may also be facilitated by inserting the cylinder with a light or no press fit. A light or no press fit may be desirable when the cylinder is located atop the split ring and locked in place by the anti-rotation lock.

The outside axial side wall may comprise an axial channel that is open to the outside axial side wall. The axial channel may be aligned with the within the split in the split spring ring on which the cylinder is mounted. The outside axial channel or slot may intersect the bottom surface and a housing open to the outside axial side wall and open to the top surface. An electrical transmission line housing may be disposed within the housing. An electrical transmission line may be disposed within the axial channel or slot and connected within the housing to an electrical transmission element that may be disposed in an annular groove in the top surface or to an adjacent electrical transmission element mounted above the cylinder. The electrical transmission element may be an inductive coupler as taught at (Prior Art) FIG. 22 and at (Prior Art) FIG. 44. Further, the transmission element may comprise a magnetically conductive electrically insulating, MCEI, core disposed within a mesh housing, as taught in the '575 reference.

Providing the axial channel or slot and the housing in the outside axial side wall may be preferred to forming a channel and housing in the wall of a tool string component due to the ease of manufacturer in the cylinder. Also, forming the channel and the housing in the outside side wall may reduce the risk of compromising the integrity of the tool string component at locations that may be subject to high stresses during the makeup of the tool string and operation of the tool string component downhole. Moreover, when the cylinders are fit into the tool string component, the outside side wall may be tightly sealed against the bore wall of the component, thereby protecting the components within the channel and the housing from damages during tool string make up and downhole operations. One or more transmission line anchors may be disposed within the housing as taught in the '356 reference.

The axial channel and housing may further comprise one or more tab closures along the outside surface of the channel and housing. The tab closures may be formed such that when the cylinder may be fitted into the tool string component, the tab closures close over the channel and housing thereby securing the transmission line within the channel and housing. The one or more tab closures may comprise a clamp. When the tab closes over the channel and housing, the clamp may provide additional security for the components within the channel and housing. The clamp may comprise a protrusion formed in the inside surface of the tab. The clamp may comprise polymer suitable for downhole conditions that may elastically deform around the components within the channel and housing. Moreover, the axial channel and housing may comprise an electrical insulating filler to further protect the components within the channel and housing.

The cylinder may be mounted within the bore using a press fit or a spring fit, respectively. The nature of the fit may depend on the downhole components and the anticipated uses for the components. The press fit may range from light to heavy. For example, a tighter press fit may be desired when the cylinder may be designed to fit into the bore of a drill pipe adjacent the threaded tool joints. These applications are likely to experience higher stresses than say an electrical application within the bore of a component installed into the bottom hole assembly.

The cylinder may further comprise a modified outside axial side wall. The modified outside wall surface may comprise discontinuities. The discontinuities may be formed by shot peening, laser peening, brinelling, hatching, plating, or by electrical or chemical ablation. Also, the side wall may comprise hard particles such as diamond, carbide, and sand to further secure the cylinder in the bore of the component. Further, the outside axial side wall may comprise a hardness greater than the hardness of the bore. Or the outside axial side wall may comprise a hardness less than the hardness of the bore.

The tool string electrical transmission line housing may be sealed against contamination by gaskets. The axial channel may further comprise a gasket intersecting the bottom surface. This gasket may prevent the introduction of gases and fluids into the channel and housing. A gasket may be disposed within the housing where the housing intersects the top surface. An internal gasket may be positioned between the channel and the housing.

The following portion of the summary is taken from the '356 reference and applies to the FIGS. 1-19, except as modified by said FIGS.

The invention has been developed in response to the present state of the art and, in particular, in response to the problems and needs in the art that have not yet been fully solved by currently available apparatus and methods. Accordingly, embodiments of the invention have been developed to effectively retain transmission lines within drill string components. The features and advantages of the invention will become more fully apparent from the following description and appended claims or may be learned by practice of the invention as set forth hereinafter.

Consistent with the foregoing, an apparatus for retaining a transmission line within a drill string component is disclosed. In one embodiment, such an apparatus includes a drill string component comprising a bore having an internal diameter. A slot is formed in the internal diameter to receive a transmission line. A first feature within the slot is configured to engage a corresponding second feature on the transmission line and thereby retain an end of the transmission line. A sleeve is inserted into the internal diameter to keep the transmission line within the slot.

In another aspect of the invention, a system for retaining a transmission line within a drill string component is disclosed. In one embodiment, such a system includes a drill string that comprises a drill string component. The drill string component has a bore having an internal diameter. A slot is formed in the internal diameter to receive a transmission line. A first feature within the slot is configured to engage a corresponding second feature on the transmission line and thereby retain an end of the transmission line. A sleeve is inserted into the internal diameter to keep the transmission line within the slot.

In another aspect of the invention, an apparatus for retaining a transmission line within a drill string component includes a drill string component comprising a bore having an internal diameter. A slot is formed in the internal diameter to receive a transmission line. A first feature within the slot is configured to engage a corresponding second feature on the transmission line and thereby retain an end of the transmission line. The first feature comprises a first angled surface configured to contact and engage a corresponding second angled surface of the second feature. The first and second angled surfaces are oriented such to keep the transmission line retained within the slot when tension is placed on the transmission line.

In another aspect of the invention, a system for retaining a transmission line within a drill string component includes a drill string comprising a drill string component. The drill string component has a bore having an internal diameter. A slot is formed in the internal diameter to receive a transmission line. A first feature within the slot is configured to engage a corresponding second feature on the transmission line and thereby retain an end of the transmission line. The first feature comprises a first angled surface configured to contact and engage a corresponding second angled surface of the second feature. The first and second angled surfaces are oriented such to keep the transmission line retained within the slot when tension is placed on the transmission line.

In another aspect of the invention, an apparatus for retaining a transmission line within a drill string component includes a drill string component comprising a bore having an internal diameter. A slot is formed in the internal diameter to receive a transmission line. A shoulder within the slot is configured to engage a tension anchor attached to the transmission line. The tension anchor is configured to hold tension in the transmission line. The tension anchor includes a first component that is attached to the transmission line, and a second component that is threaded onto the first component. In certain embodiments, the second component contains a housing configured to enable connection to the transmission line.

In another aspect of the invention, a system for retaining a transmission line within a drill string component includes a drill string comprising a drill string component. The drill string component has a bore having an internal diameter. A slot is formed in the internal diameter to receive a transmission line. A shoulder within the slot is configured to engage a tension anchor attached to the transmission line. The tension anchor is configured to hold tension in the transmission line. The tension anchor includes a first component that is attached to the transmission line, and a second component that is threaded onto the first component. In certain embodiments, the second component contains a housing configured to enable connection to the transmission line.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

(PRIOR ART) FIG. 20 is a cross-sectional view showing a drill string component with a slot in each end configured to retain a transmission line.

(PRIOR ART) FIG. 21 is a cross-sectional view showing the drill string component of FIG. 20 with the transmission line installed.

(PRIOR ART) FIG. 22 is an enlarged cross-sectional view showing the pin end of the drill string component.

(PRIOR ART) FIG. 23 is an enlarged cross-sectional view showing the pin end and associated slot of the drill string component.

(PRIOR ART) FIG. 24 is a high-level block diagram showing various design choices for installing a transmission line in a drill string component.

(PRIOR ART) FIG. 25A is a cross-sectional view showing a tension anchor held to the transmission line using a flare.

(PRIOR ART) FIG. 25B is a cross-sectional view showing a tension anchor threaded onto the transmission line.

(PRIOR ART) FIG. 26A is a cross-sectional view showing a tension anchor crimped onto the transmission line.

(PRIOR ART) FIG. 26B is a cross-sectional view showing a tension anchor crimped and threaded onto the transmission line.

(PRIOR ART) FIG. 27 is an exploded view showing one embodiment of a transmission line retention system in accordance with the invention.

(PRIOR ART) FIG. 28 is a cross-sectional view showing one embodiment of a drill string component with the transmission line and transmission element installed.

(PRIOR ART) FIGS. 29A through 31B show one embodiment of a transmission line retention system within a drill string component, and a method for installing the transmission line in the drill string component.

(PRIOR ART) FIGS. 31 through 36 show another embodiment of a transmission line retention system within a drill string component, and a method for installing the transmission line in the drill string component.

(PRIOR ART) FIGS. 36 and 38 show another embodiment of a transmission line retention system within a drill string component, and a method for installing the transmission line in the drill string component.

(PRIOR ART) FIGS. 39A through 43B show another embodiment of a transmission line retention system within a drill string component, and a method for installing the transmission line in the drill string component.

(PRIOR ART) FIG. 44 is a diagram of an inductive coupler taken from the '575 reference at FIG. 4 of said reference.

DETAILED DESCRIPTION

Figure 1:
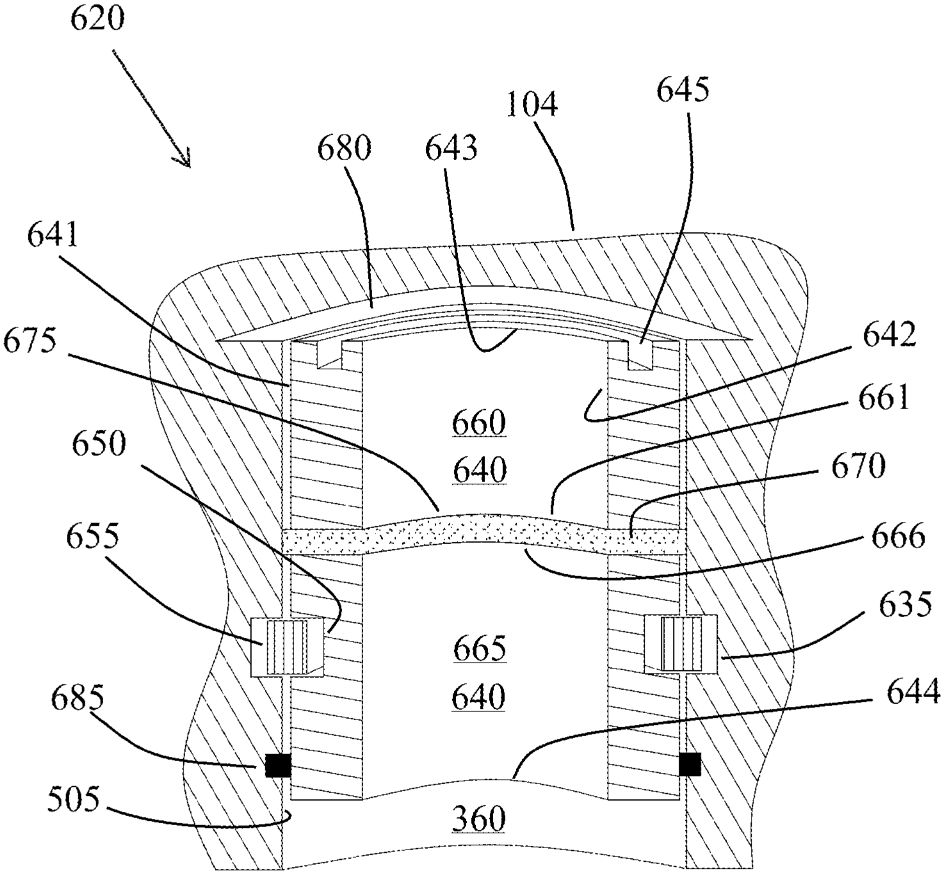
FIG. 1 is an exemplary sectioned diagram of a bipartite transmission coupler assembly of the present invention.
Figure 2:
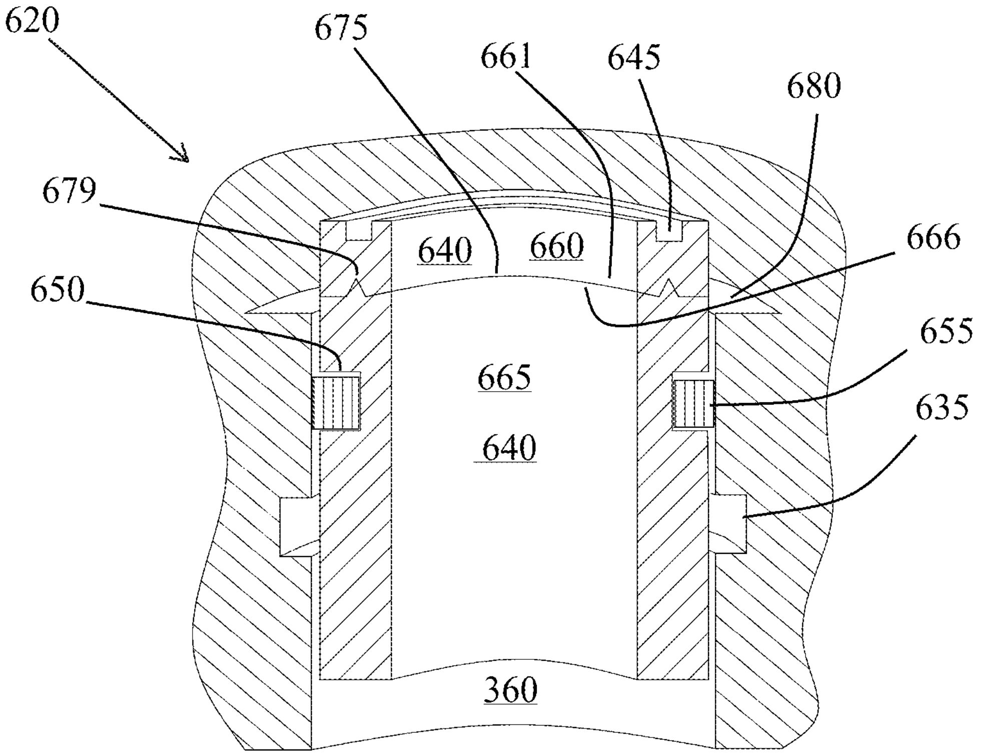
FIG. 2 is an exemplary sectioned diagram of a bipartite transmission coupler assembly of the present invention being inserted into bore of downhole tool.
Figure 3:
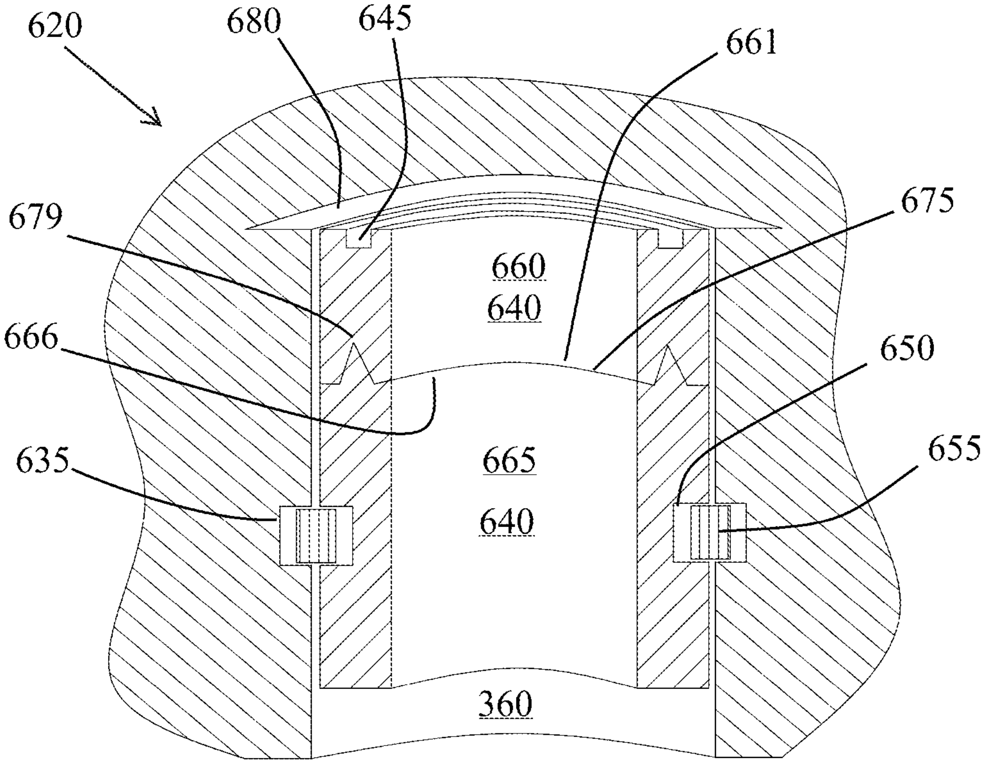
FIG. 3 is an exemplary sectioned diagram of a bipartite transmission coupler assembly inserted into the bore of downhole tool and having corresponding interfacial walls.
Figure 4:
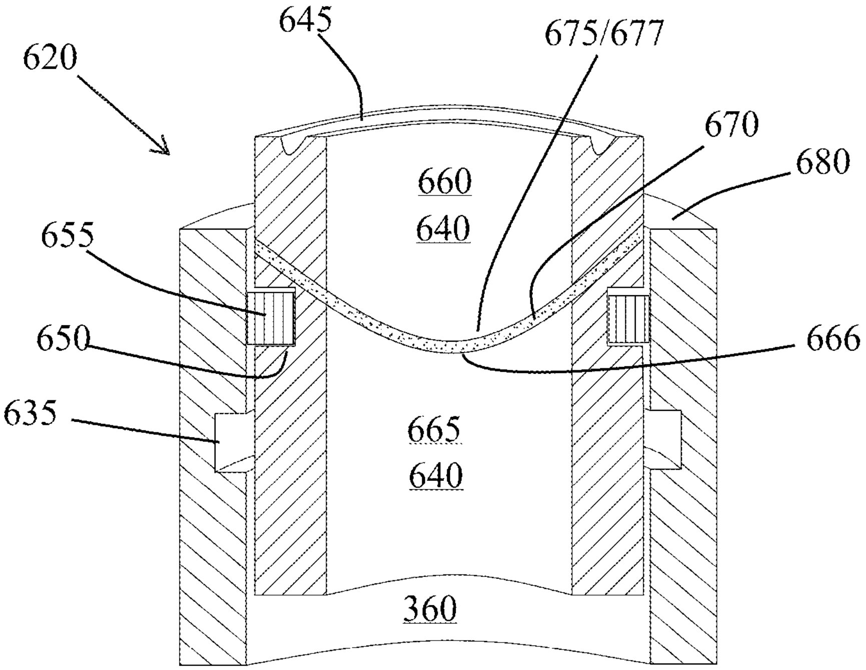
FIG. 4 is an exemplary sectioned diagram of another iteration of a bipartite transmission assembly having corresponding interfacial walls.
Figure 5:
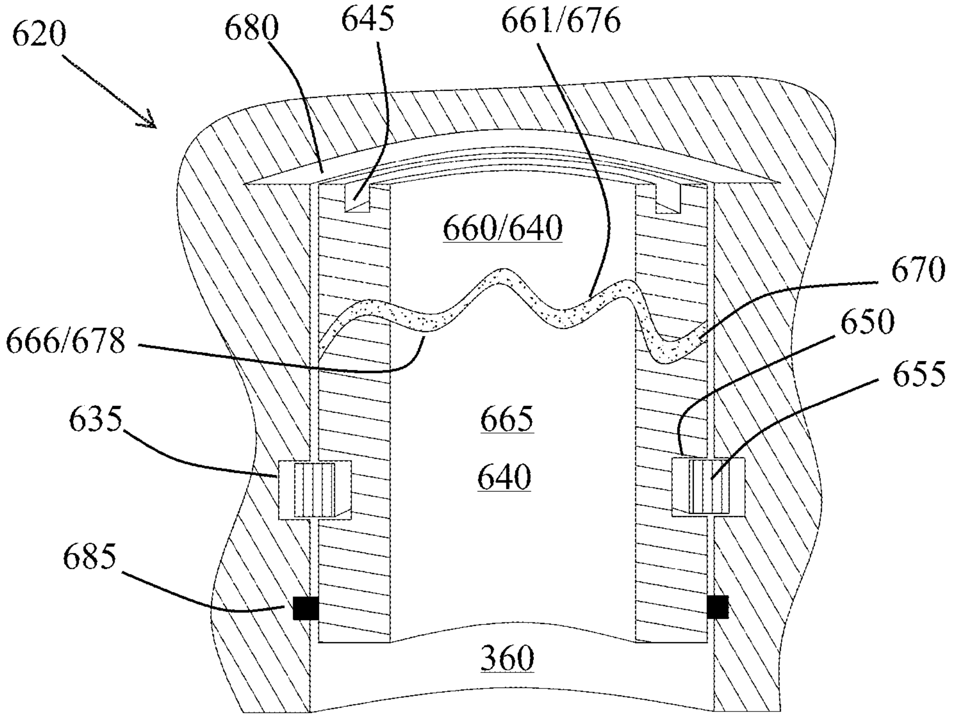
FIG. 5 is an exemplary sectioned diagram of another iteration of a bipartite transmission assembly having a gasket and seals.
Figure 6:
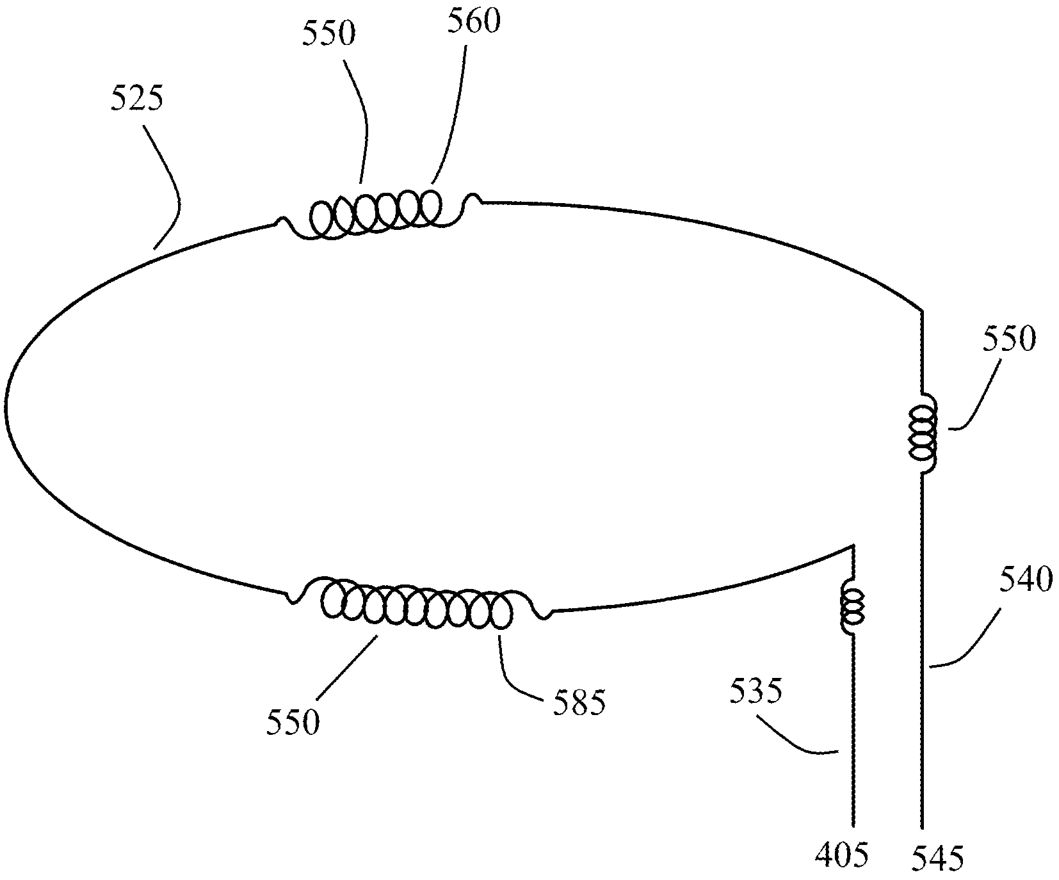
FIG. 6 is a perspective diagram of a resilient conductor of the present invention.
Figure 7:
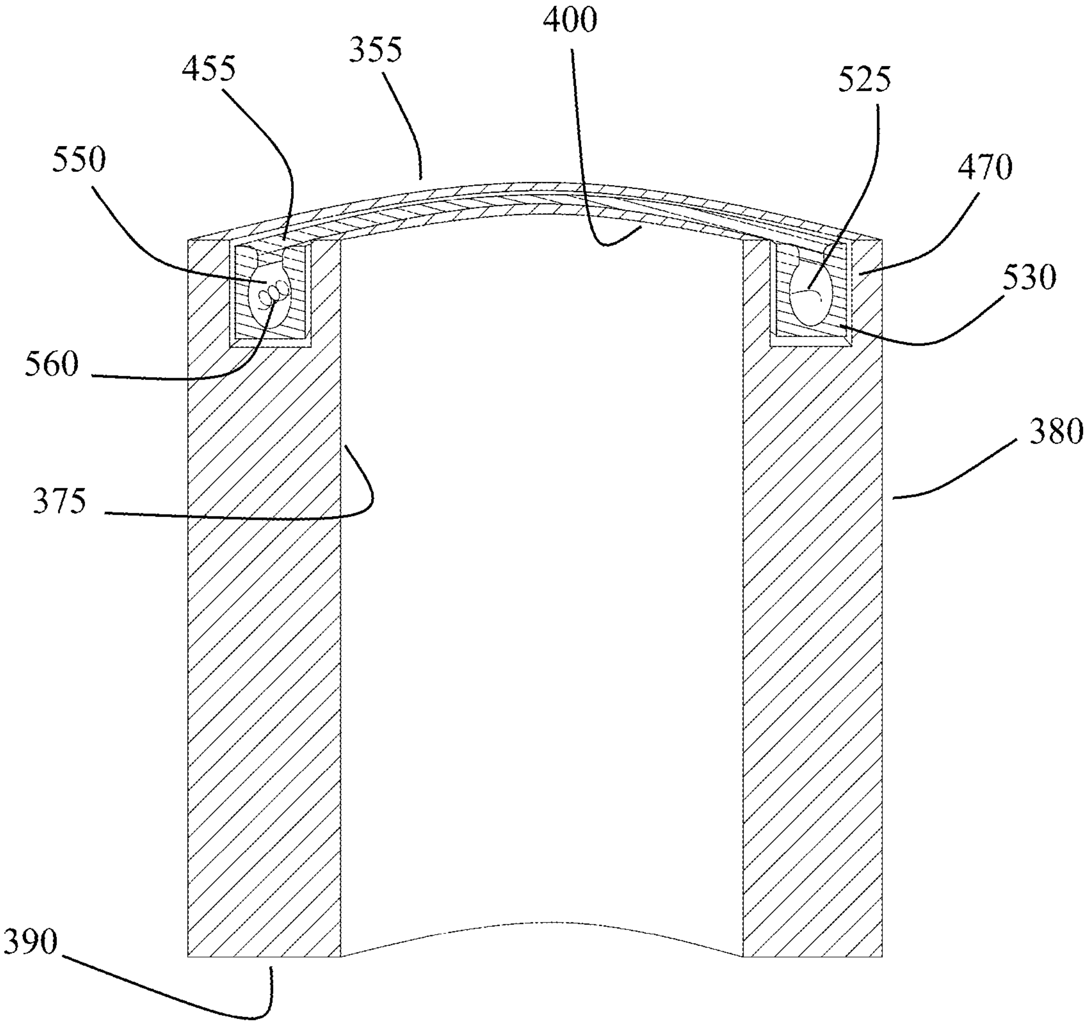
FIG. 7 is a side view diagram of a resilient conductor within an MCEI channel.
Figure 8:
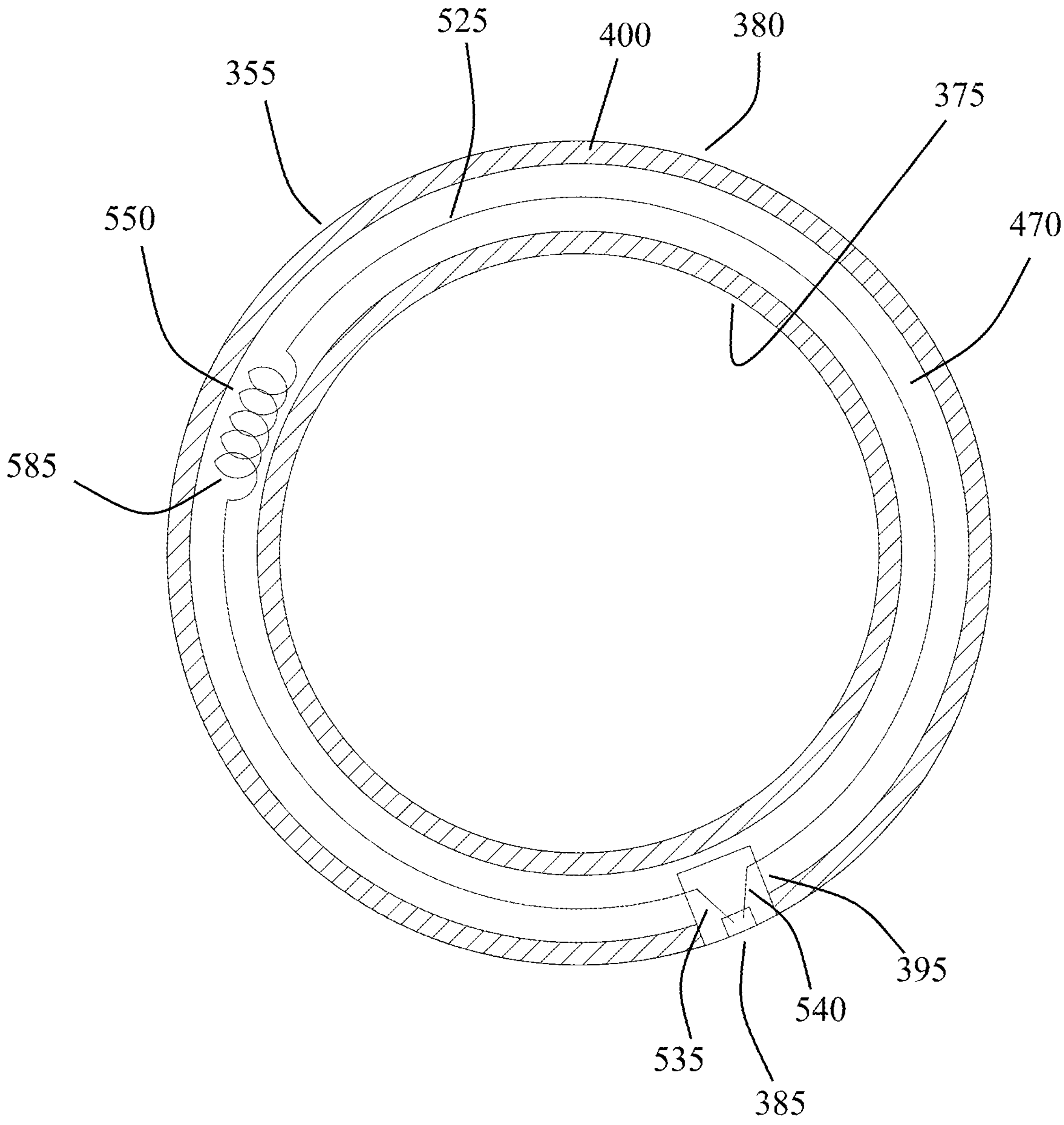
FIG. 8 is a plan view diagram of a resilient conductor within a recess.
Figure 9:
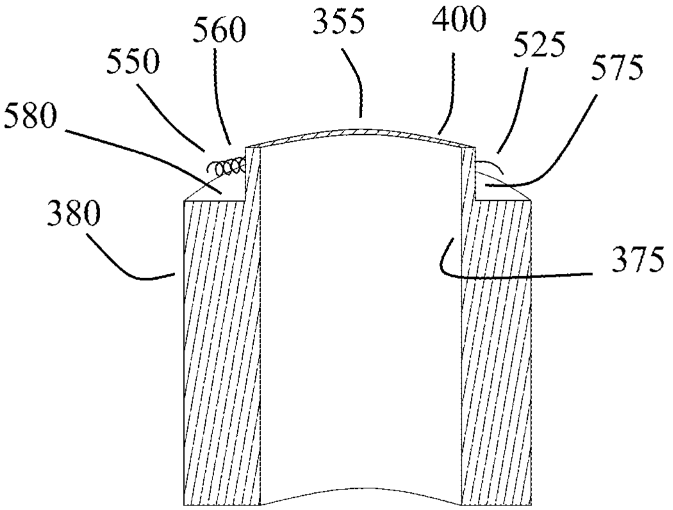
FIG. 9 is a side view diagram of resilient conductor within a stepped recess.
Figure 10:
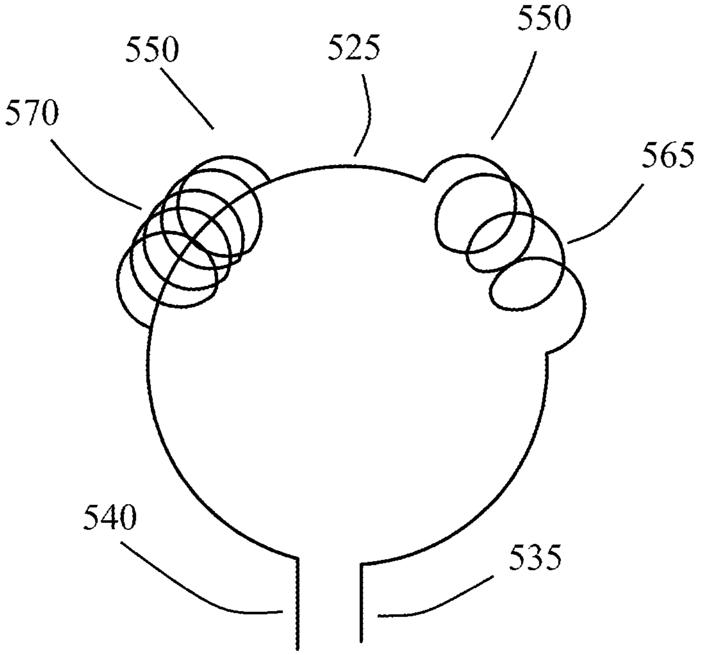
FIG. 10 is a perspective view of a resilient conductor having multiple turn segments in series and in parallel.
Figure 11:
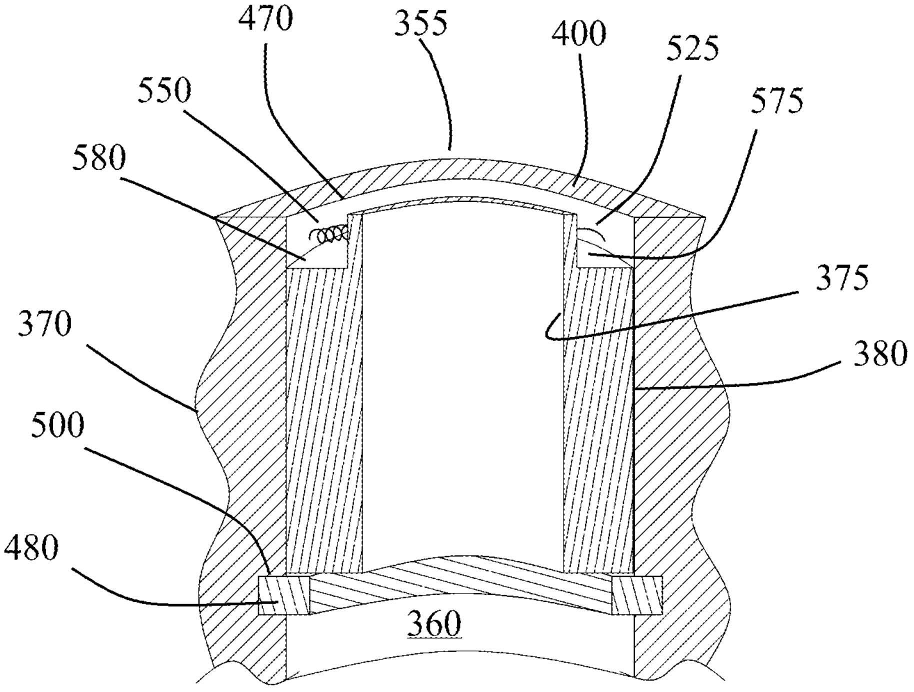
FIG. 11 is a side view diagram of resilient conductor within a cylindrical housing mounted within the bore of downhole tool.
Figure 12:
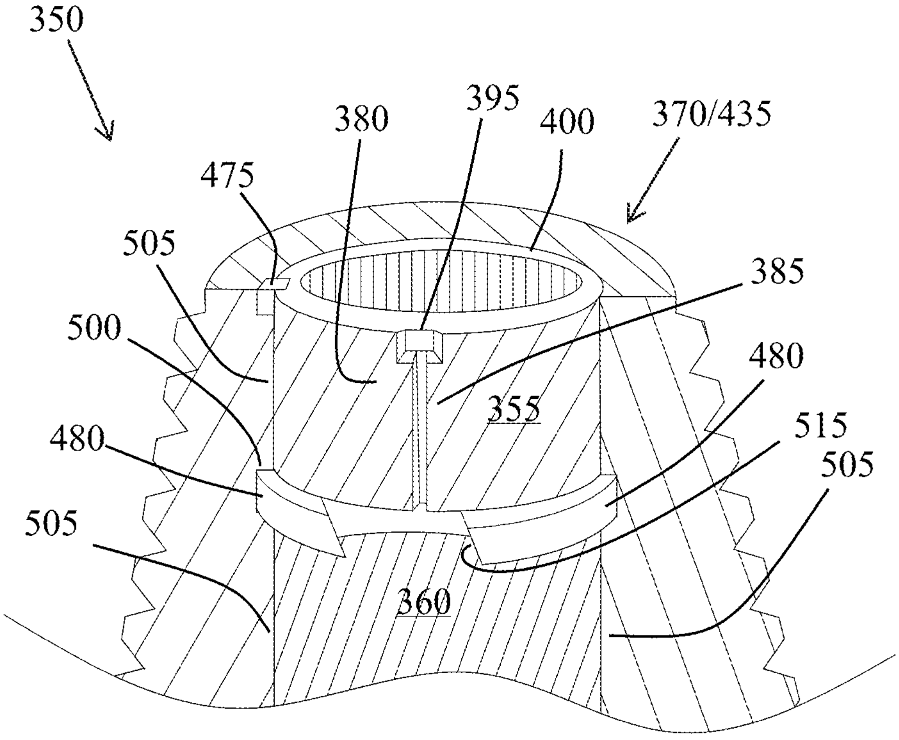
FIG. 12 is a diagram of a split spring ring supporting a cylinder of the present invention.
Figure 13:
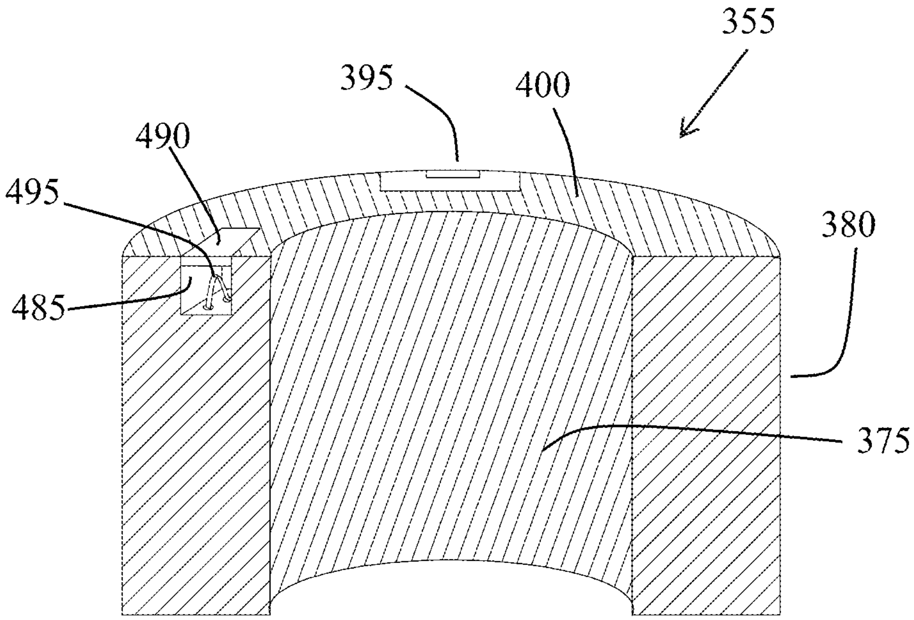
FIG. 13 is a diagram of cross section of a cylinder of the present invention showing an extraction assembly.
Figure 14:
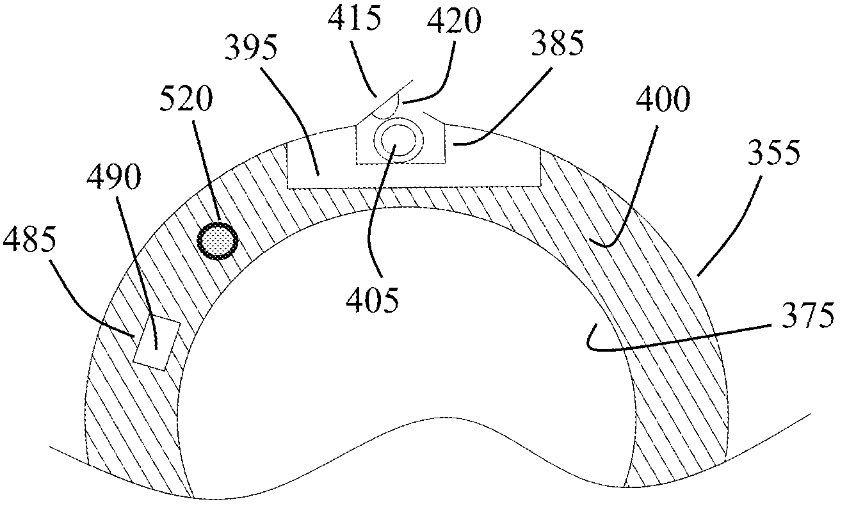
FIG. 14 is a diagram of a plan view of the diagram of FIG. 13.
Figure 15:
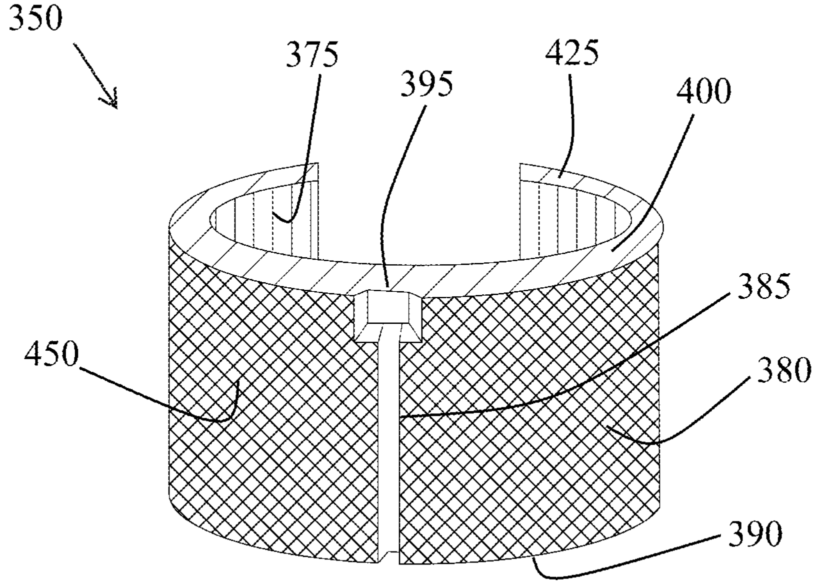
FIG. 15 is a diagram of a slit cylinder assembly of the present invention.
Figure 16:
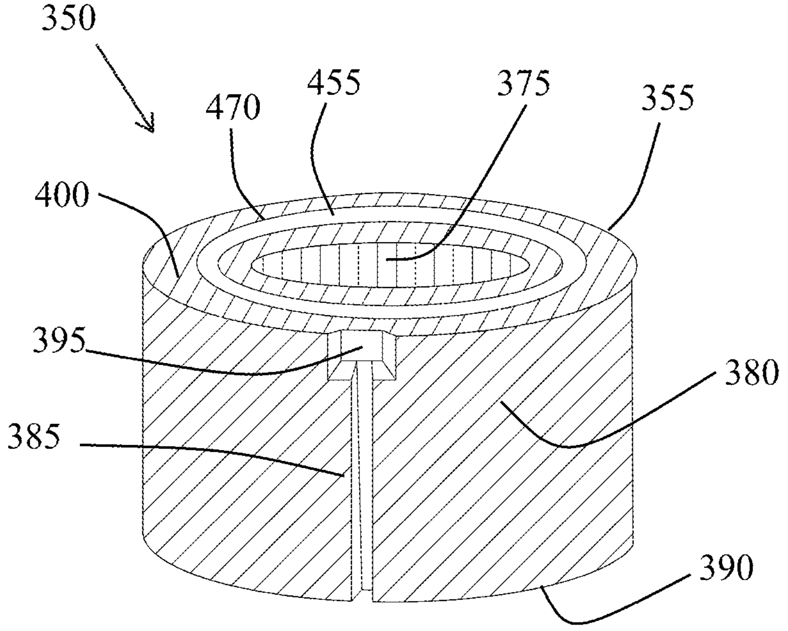
FIG. 16 is a diagram of a cylinder comprising an inductive coupler.
Figure 17:
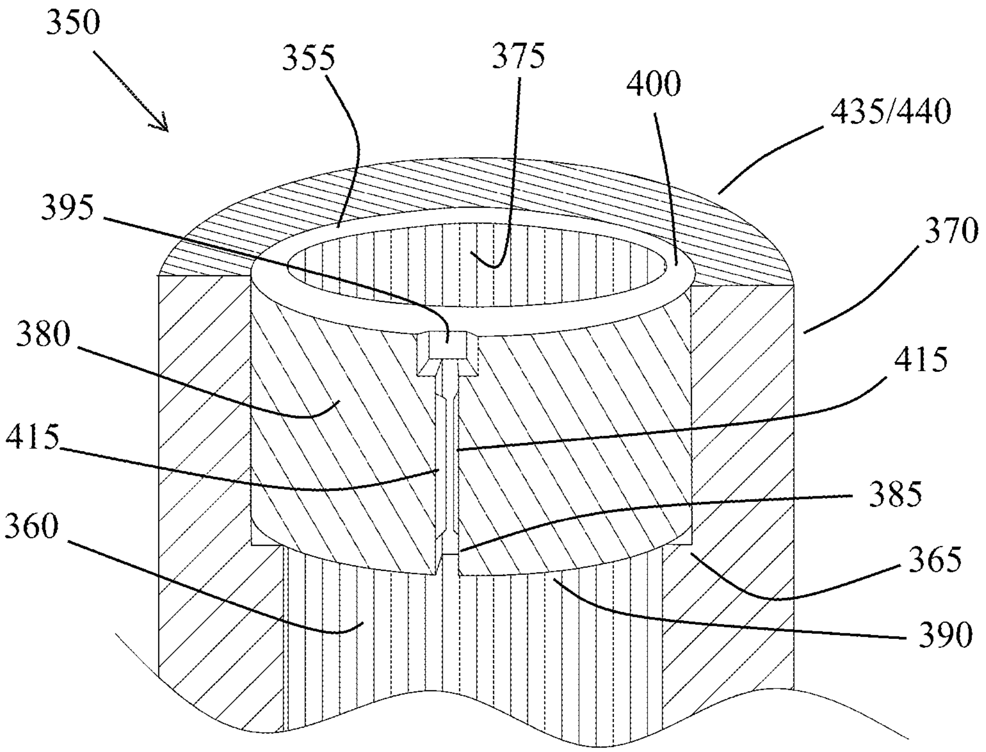
FIG. 17 is a diagram of a cylinder fit into a bore of a downhole tool.
Figure 18:
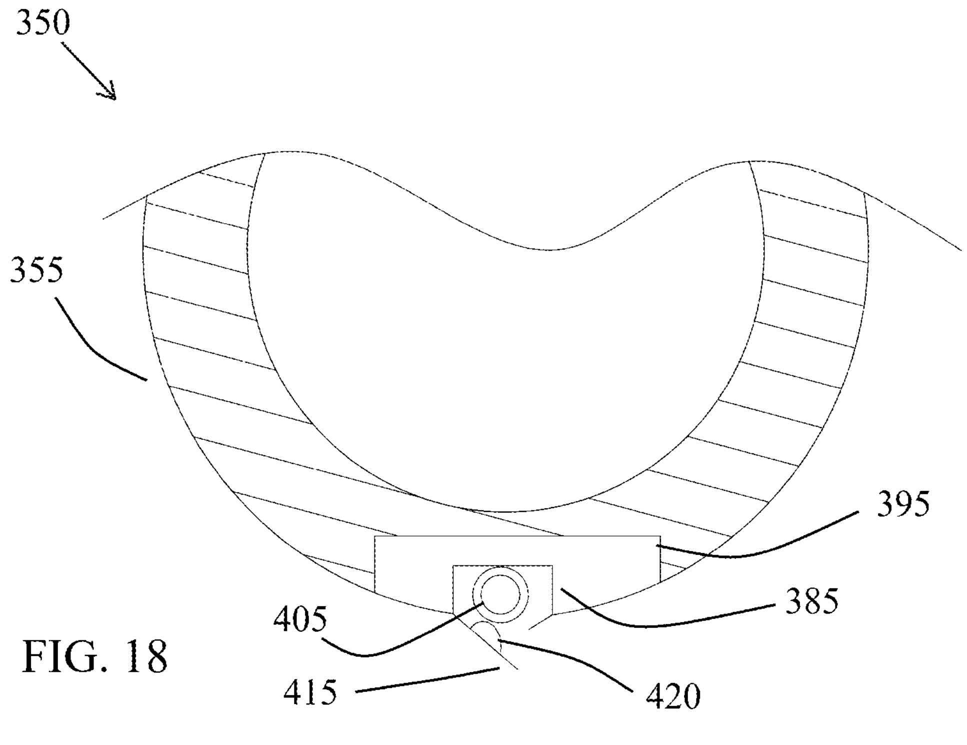
FIG. 18 is a partial diagram plan view of a cylinder of the present invention.
Figure 19:
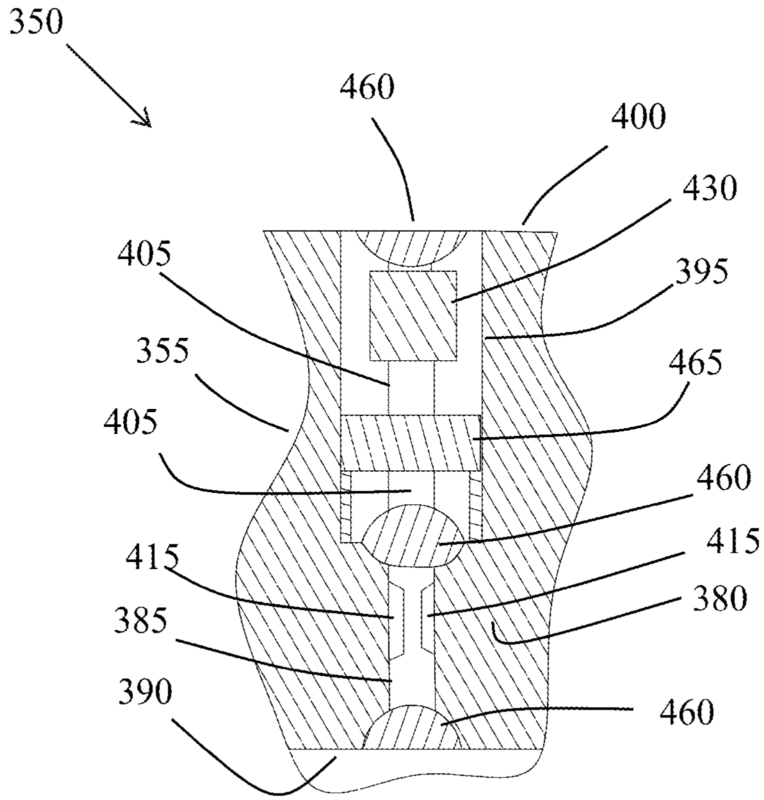
FIG. 19 is a diagram of an axial channel and housing of the present invention.

The present application presents modifications and alterations to the '356 reference incorporated herein. The following detailed description is related to FIGS. 1-19. The teachings of the '356, '533, and the '575 references apply to all the FIGS. in so far as such teachings are not modified by the FIGS. 1-19.

Regarding FIGS. 1-5, the present application discloses a bipartite transmission coupler assembly 620, comprising a downhole tool 440 comprising an axial bore 360 comprising a bore wall 505. The downhole tool may be a drill pipe, production tubing, heavy weight drill pipe, drill collar, riser, or drill string tool associated with the bottom hole assembly. The downhole tool may be a drill bit. Furthermore, the tool may be associated with drill rig equipment.

The axial bore wall 505 may comprise a first annular groove 635 open to the bore 360. The assembly may further comprise an elongate cylinder 640 comprising an outside wall 641 and an inside wall 642 separated by a top 643 and bottom wall 644. The top wall 643 may comprise an annular recess, groove, or housing 645 configured to house the transmission assembly 100, see (Prior Art) FIG. 44 and (Prior Art) FIG. 22, 300.

The outside wall 641 of the elongate cylinder may comprise a second annular groove 650 configured to align with the first annular groove 635 when installed within the bore 360. An annular spring ring 655 may be compressed within the second annular groove 650 such that when the first annular groove 635 and the second annular groove 650 are aligned within the bore 360, the spring ring 655 at least partially expands radially into the first annular groove 635, securing the elongate cylinder 640 within the axial bore 360. The spring ring 655 may comprise two or more rings mounted atop one another in such a fashion that the actual length of the elongate cylinder may vary according to the needs of the downhole tool.

The elongate cylinder 640 may be divided into a first part 660 comprising a first annular interfacial wall 661 and a second part 665 comprising a second annular interfacial wall 666, the first part 660 may further comprise the annular recess 645 and the second part may further comprise the second annular groove 650. The elongate cylinder may comprise additional annular parts according to the needs of the downhole tool. The configuration of the mating surfaces of respective interfacial walls may correspond with each other forming a tight seal between the respective first and second parts. The corresponding interfacial walls may promote stability of the coupler assembly within the downhole tool. The corresponding interfacial walls of the first part 660 and the second part 665, or additional parts as may be desirable, may be separated by an annular gasket 670, or other resilient spacer, between their respective interfacial walls 661, 666. The gasket 670, or other spacer may provide a seal between the elongate cylinder and the bore wall.

The respective interfacial walls 661, 666 may comprise corresponding linear configurations 675. In case there are more than two interfacial walls, the corresponding linear configurations may vary. The respective interfacial walls 661, 666 may comprise corresponding non-linear configurations 676. Where a gasket or other spacer is interposed between the interfacial walls, the actual configuration of the respective interfacial walls may not match, since the resiliency of the gasket or spacer may accommodate a variety of interfacial configurations.

The configuration of the corresponding interfacial walls may comprise a variety of configurations. For example, the respective interfacial walls 661, 666 may comprise corresponding conical configurations 677, or corresponding wave configurations 678, or corresponding groove and ridge configurations 679. It may be desirable that the respective interfacial walls do not correspond with each other. In such cases, the resilient material between the interfacial walls may accommodate the differences in the configurations.

The transmission coupler assembly 100, (Prior Art) FIG. 44 and (Prior Art) FIG. 22, 300, may comprise an MCEI channel housing an electrical conductor comprising a ground end and a transmission end, see also (Prior Art) FIG. 1 of the '533 reference. The transmission end may be in communication with electrical and mechanical equipment within the downhole tool 440. The electrical and mechanical equipment may include sensors and gauges useful in the downhole operations. The transmission end may be in communication with a transmission coupler assembly 100, or other device or transmission assembly, at the opposite end of the downhole tool 440, or a different locations along the drill string or within the bottom hole assembly. The transmission coupler 100 may be in communication with the drill bit.

The MCEI channel may be embedded within an annular polymeric block comprising MCEI particles, see the '533 reference. The MCEI channel may be perforated, see the '533 reference, to provide a passageway for the respective ends of the electrical conductor to exit the channel.

The axial bore wall 505 may be within a threaded pin end tool joint 102 of a drill pipe 100, see (Prior Art) FIG. 23. The first annular groove 635 may be located in the axial bore wall 505 opposite threads 2 through 5, 630 (Prior Art) FIG. 23 of the pin end tool joint 102. The axial bore wall 505 may be adjacent an internal shoulder 680, see (Prior Art) FIG. 21, within a threaded box end tool joint 104 of a drill pipe 100.

The first annular groove 635 may be located within the axial bore wall 505 of the threaded box end tool joint 104 between 0.75 and 5.5 inches from the internal shoulder 680.

The elongate cylinder 640 may comprise one or more annular seals 685 between the outside wall 642 of the cylinder 640 and the axial bore wall 505. The seals may be made from a polymer or and metal. The annular seals may serve to seal out pressure and contaminants from the downhole environment.

The elongate cylinder 640 may be assembled with a press fit into the axial bore 360. The press fit may vary from light to heavy depending on the requirements of the downhole tool. Alternatively, the elongate cylinder may be assembled with only a slip fit. The second part 665 of the bipartite cylinder may be press fit into the axial bore 360, while the first part 660 may be slip fit into the axial bore 360 proximate the second part 665. It may be desirable to remove the first part without disturbing the second part.

Regarding FIGS. 6-19, the present application discloses a resilient conductor 525 for an inductive coupler assembly 455 that may comprise an inductive coupler housing 355 comprising an annular recess 470. A magnetically conductive electrically insulating, MCEI, channel 530 may be located within the recess 470. A flat or planar electrically conductive wire loop 525 may be located within the MCEI channel 530, the loop 525 may comprise a first end 535 and a second end 540. The first end 535 may be configured for connection to a transmission line 405 and the second end 540 may be configured for attachment to ground 545 within the inductive coupler assembly. The wire loop 525 may comprise one or more helical segments 550 between the first end 535 and the second end 540, each segment 550 may comprise a plurality of turns 560. The channel 530 may comprise an electrically nonconductive filler to aid in isolating the conductor 525.

The inductive coupler housing 355 may comprise a cylinder 355 comprising an annular exterior side wall 380 and an annular interior side wall 375 joining an annular top wall 400 and annular bottom wall 390. The annular recess 470 may be open to the top wall 400 between the exterior side wall 380 and the interior wide wall 375. The exterior side wall 380 may comprise an annular recess 575 that may comprise an annular step 580 joining the exterior side wall 380 and the top wall 400.

The first 535 and second 540 ends of the loop 525 may comprise a hardness greater than the hardness of the loop 525. The annular recess 470 may comprise an electrically nonconductive filler. The walls of the annular recess 470 may comprise a hardness greater than the hardness of the cylindrical housing 355. The electrically conductive wire loop 525 may be insulated.

The MCEI channel 530 may be embedded within an MCEI core 105, see (Prior Art) FIG. 44. The MCEI channel 530 may comprise a plurality of MCEI segments, per the '575 reference. The MCEI channel 530 may be housed within a mesh casing, 125, (Prior Art) FIG. 44, as disclosed in the '575 reference.

The transmission line 405 may be connected to an electrically conductive loop as disclosed herein within a like MCEI channel within a downhole tool. Also, the transmission line 405 may be connected to an electrical conductor within an MCEI channel of a different configuration within a downhole tool or to other tools and sensors within the downhole tool.

The inductive coupler housing 355 may be mounted within the bore 360 of a downhole tool joint 435 or downhole tool 440. The inductive coupler housing 355 may be mounted onto a split ring 480 protruding from a groove 500 in a bore wall 505 of a downhole tool 440 or joint 435. Mounting the housing 355 on the ring 480 within the bore of a downhole tool, such as a drill pipe etc., may be preferable to mounting the housing 355 onto a shoulder within the bore because the groove 500 may be easier to manufacture and less likely to negatively affect the integrity of the downhole tool under downhole conditions. For example, forming the shoulder within the bore of a tool may require counter boring the bore, thus thinning the side wall of the downhole tool where the side wall may already be susceptible to failure under extreme conditions. On the other hand, forming a groove may remove less material from side wall and the groove may be located where the side wall is thicker so as not to negatively impact the integrity of the side wall under the stresses associated with downhole operations. The inductive coupler housing 355 may be press fit within the bore 360 of a tool joint 435, or downhole tool 440, the press fit may comprise a range from a light press fit to a hard press fit. The inductive coupler housing 355 may be slip fit within the bore 360 of the tool joint 435, or downhole tool 440. A slip fit may be adequate for the housing 355 since the housing may not be tied to the primary and secondary shoulders in the drill pipe and the housing may not experience the torque and compressive forces normally experienced by the primary and secondary shoulders of the drill pipe during joint makeup and other drill pipe operations.

The helical segments 550 along the resilient conductor 525 may be spaced apart along the electrically conductive loop 525. The segments 550 may add resilience to the loop 525. The helical segments 550 may comprise substantially vertical loops 585; the orientation of the loops may range from horizontal to vertical. The helical segments 550 may be formed within the loop 525 itself or the segments may be attached to the loop 525 after manufacture. The segments 550 may be arranged along the loop 525 in series 565 or in parallel 570.

Additionally, a tool string electrical transmission line housing, or inductive coupler housing, 350 is disclosed that may comprise a cylinder 355 adapted for mounting within a bore 360 of a tool string component 370. The housing 350 may also comprise a slit cylinder 425. The cylinder 355/425 may be disposed on or adjacent to a shoulder 365 within the bore 360. The cylinder 355/425 may be positioned atop a split spring ring 480 housed within a groove 500 in the bore wall 505 of the component 370. The split spring ring 480 may be preferred because it eliminates counterboring the bore wall 360 to provide the shoulder 365. The spring ring 480 may be compressed for insertion into the groove 500 and then released. The cylinder 355/425 may comprise an inside axial side wall 375 spaced apart from an outside axial side wall 380, the respective side walls joining top 400 and bottom 390 surfaces.

The outside axial side wall 380 may comprise an axial channel 385 that is open to the outside axial side wall 380. The channel 385 may be aligned within the split 515 of the ring 480. The split 515 may comprise a gap at 515 that may allow passage of the transmission line 405 into the axial channel 385. The outside axial channel may intersect the bottom surface 390 and a housing 395 open to the outside axial side wall 380 and open to the top surface 400. One or more an anti-rotation locks 475 may be disposed on the top surface 400, between the cylinder 355 outside side wall 380 and the component bore wall 505. The locks 475 may prevent the cylinder 355/425 from movement within the bore 360/505.

One or more extractor housings 485 may be formed within the top surface 400. The extractor housings 485 may comprise an open recess or a tapped or a threaded opening 520 within the surface 400. An extractor 495 may reside within the housing 485. The extractor may comprise an eye bolt, strap, threaded opening, threads, hook, or a groove, or a combination thereof, to facilitate the removal of the cylinder. The housings 485 or tapped or threaded openings 520 may be provided with workable filler or a replaceable, sacrificial cover 490. The workable filler may be sufficient to protect the threaded opening from contamination and be removed by drilling or other means when the threaded opening is employed for removal of the cylinder. The sacrificial cover 490 may be breached to access the extractor 495 to allow removal of the cylinder 355/425. The cover 490 may prevent contamination from entering the housing 485 and interfering with the extractor 495. Removal of the cylinder 355/425 may also be facilitated by inserting the cylinder into the component bore 360/505 with a light or no press fit. A light or no press fit may be desirable when the cylinder is located atop the split ring 480 and locked in place by the anti-rotation lock 475.

An electrical transmission line connector 430 may be disposed within the housing 395. An electrical transmission line 405 may be disposed within the axial channel 385 and connected within the connector 430 to an electrical transmission element 455 that may be disposed in an annular groove 470 in the top surface 400 or to an adjacent electrical transmission element 410 mounted above the cylinder. The electrical transmission element 410/455 may be an inductive coupler as taught at (Prior Art) FIG. 22 and at (Prior Art) FIG. 44. Further, the transmission element 410/455 may comprises a magnetically conductive electrically insulating, MCEI, core disposed within a mesh housing, as taught in the '575 reference.

Disposing the transmission element 410/455 in the top surface 400, or adjacent the top surface 400, may be preferred over placing the transmission element in the primary or secondary shoulders of a downhole tool. The downhole tool shoulders are exposed to damage during joint makeup or over torquing of the drill string during drilling operations. Therefore, the risks of damage to the transmission elements are reduced or eliminated by locating them away from the respective shoulders.

Providing the axial channel 385 and the housing 395 in the outside axial side wall 380 may be preferred to forming a channel and housing in the wall of a tool string component 370 due to the ease of manufacturer in the cylinder 355/425. Also, forming the channel 385 and the housing 395 in the outside side wall 380 may reduce the risk of compromising the integrity of the tool string component 370 at locations that may be subject to high stresses during the makeup of the tool string and operation of the tool string component 370 downhole. Moreover, when the cylinders 355/425 are fit into the tool string component 370, the outside side wall 380 may be tightly sealed against the bore wall 360 of the component 370, thereby protecting the components within the channel 385 and the housing 395 from damages during tool string make up and downhole operations. A transmission line anchor 465 may be disposed within the housing 395 as taught in the '356 reference.

The axial channel 385 and housing 395 may further comprise one or more tab closures 415 along the outside surface of the channel 385 and housing 395. The tab closures 415 may be formed such that when the cylinder 355/425 may be fitted into the tool string component, the tab closures 415 close over the channel 385 and housing 395 thereby securing the transmission line 405 within the channel 385 and housing 395. The one or more tab closures 415 may comprise a clamp 420. When the tab 415 closes over the channel and housing, the clamp may provide additional security for the components within the channel 385 and housing 395. The clamp 420 may comprise a protrusion formed in the inside surface of the tab 415. The clamp 415 may comprise polymer suitable for downhole conditions that may elastically deform around the components within the channel and housing. Moreover, the axial channel 385 and housing 395 may comprise an electrical insulating filler to further protect the components within the channel and housing.

The cylinder 355/425 may be mounted within the bore 360 using a press fit or a spring fit, respectively. The nature of the fit may depend on the downhole components and the anticipated uses for the components and may range from light to heavy press fit. For example, a tighter press fit may be desired when the cylinder may be designed to fit into the bore 360 of a drill pipe adjacent the threaded tool joints 440. These applications are likely to experience higher stresses than say an electrical application within the bore 360 of a component 440 installed into the bottom hole assembly 455.

The cylinder 355/425 may further comprises a modified outside axial side wall 380. The modified outside wall surface 380 may comprise discontinuities 450. The discontinuities 450 may comprise hard particles, knurling, grooves, threads, or a combination thereof. The discontinuities 450 may be formed by shot peening, laser peening, brinelling, hatching, plating, or by electrical or chemical ablation. Also, the side wall 380 may comprise hard particles such as diamond, carbide, silicon nitride, and sand to further secure the cylinder in the bore of the component. Further, the outside axial side wall 380 may comprise a hardness greater than the hardness of the bore 360. Or the outside axial side wall 380 may comprise a hardness less than the hardness of the bore 360.

The tool string electrical transmission line housing may be sealed against contamination by gaskets. The axial channel 385 may further comprise a gasket 460 intersecting the bottom surface 390. This gasket 460 may prevent the introduction of gases and fluids into the channel 385 and housing 395. A gasket 460 may be disposed within the housing 395 where the housing intersects the top surface 400. An internal gasket may be positioned between the channel 385 and the housing 395.

The following portion of the detailed description is taken from the '356 reference and applies to FIGS. 1-19, except as modified by said FIGS.

It will be readily understood that the components of the present invention, as generally described and illustrated in the Figures herein, could be arranged and designed in a wide variety of different configurations. Thus, the following more detailed description of embodiments of apparatus and methods of the present invention, as represented in the Figures, is not intended to limit the scope of the invention, as claimed, but is merely representative of various selected embodiments of the invention.

The illustrated embodiments of the invention will be best understood by reference to the drawings, wherein like parts are designated by like numerals throughout. Those of ordinary skill in the art will, of course, appreciate that various modifications to the apparatus and methods described herein may be easily made without departing from the essential characteristics of the invention, as described in connection with the Figures. Thus, the following description of the Figures is intended only by way of example, and simply illustrates certain selected embodiments consistent with the invention as claimed herein.

Referring to (PRIOR ART) FIG. 20, a cross-sectional view showing one embodiment of a drill string component 100 is illustrated. As shown, the drill string component 100 includes a pin end 102 and box end 104. Between the pin end 102 and box end 104 is the body 106 of the drill string component 100. A typical length for a drill string component 100 is between twenty and ninety feet. Multiple drill string components 100 may be assembled into a drill string that can extend as long as 30,000 feet, which means that many hundreds of drill string components 100 (e.g., sections of drill pipe and downhole tools) may be assembled into a drill string. A drill string component 100 may include any number of downhole tools, including but not limited to heavyweight drill pipe, drill collar, crossovers, mud motors, directional drilling equipment, stabilizers, hole openers, sub-assemblies, under-reamers, drilling jars, drilling shock absorbers, and other specialized devices, which are all well known in the drilling industry.

Various designs may be used for the pin end 102 and box end 104 of the drill string component 100. Embodiments of the invention are useful for pin and box end designs that have a uniform or upset internal diameter 108 with the rest of the drill string component 100. As shown, slots 110*a*, 110*b* may be incorporated into the pin end 102 and box end 104 of the drill string component 100 to receive a transmission line. The transmission line may communicate signals between the pin end 102 and box end 104 of the drill string component 100, thereby enabling data to be transmitted along the drill string. In certain embodiments, the slots 110*a*, 110*b* may be open to the internal diameter 108 of the drill string component 100 to facilitate installation of the transmission line. As further shown, features 112*a*, 112*b* (e.g., shoulders, etc.) may be incorporated into the slots 110*a*, 110*b* to aid in retaining ends of the transmission line. These features 112*a*, 112*b* may be implemented in different ways as will be discussed in more detail hereafter.

(PRIOR ART) FIG. 22 shows the drill string component 100 of (PRIOR ART) FIG. 20 with the transmission line 200 installed. As shown, the transmission line 200 is routed through the internal diameter 108 along the length of the drill string component 100. One end of the transmission line 200 is retained at or near the pin end 102 and the other end of the transmission line 200 is retained at or near the box end 104. In certain embodiments, the transmission line 200 is an armored transmission line 200, meaning that metal tubing or another robust material may surround the transmission line 200 and be used to protect internal wiring and/or insulation of the transmission line 200. Inside the armor, the transmission line 106 may include coaxial cable, electrical wires, optical fibers, or other conductors or cables capable of transmitting a signal.

One potential problem with routing a transmission line 200 through a drill string component 100 is that the transmission line 200 may interfere with tools, fluids, or debris moving through the central bore 108 of the drill string component 100. These tools, fluids, or debris have the potential to sever or damage the transmission line 200, thereby terminating or interrupting signals transmitted along the drill string. Thus, apparatus and methods are needed to route transmission lines 200 through drill string components 100 in a safe and reliable manner. Ideally, such apparatus and methods would be able to maintain tension in the transmission line 200 to minimize movement within the central bore 108 and minimize interference with tools or other debris moving therethrough. Ideally, such apparatus and methods will enable quick and inexpensive installation of transmission lines 106 in drill string components 100 without the need for expensive equipment or highly trained personnel.

(PRIOR ART) FIG. 22 is an enlarged cross-sectional view showing a pin end 102 of a drill string component 100. As shown, the pin end 102 may include a transmission element 300 installed in a groove or recess in a leading face 302 of the pin end 102 to transmit data and signals across the tool joint. A corresponding transmission element 300 may be installed in the box end 104. The transmission element 300 may communicate using any known method. For example, in certain embodiments, the transmission element 300 may use direct electrical contacts or inductive coupling to transmit data signals across the tool joint.

PRIOR ART) FIG. 23 is an enlarged cross-sectional view showing the pin end 102 of the drill string component 100 with the transmission element 300 and transmission line 200 removed. In this embodiment, the slot 110*a* and corresponding feature 112*a* are more clearly visible. In this embodiment, the feature 112*a* is a shoulder incorporated into the slot 110*a* that causes the slot 110*a* to get wider as it approaches the pin end 102. This shoulder may engage a corresponding feature 304, e.g., a tension anchor 304 as shown in (PRIOR ART) FIG. 22 coupled to or incorporated into an end of the transmission line 200. The shape, configuration, and location of the features 112*a*, 304 are provided by way of example and not limitation. Other shapes, configurations, and locations for the features 112*a*, 304 are possible and within the scope of the invention.

Referring to (PRIOR ART) FIG. 24, a high-level block diagram showing various design choices for installing a transmission line 200 in a drill string component 100 is illustrated. As shown, at a highest level, a design methodology 500 may designate where a transmission line 200 is anchored within the drill string component 100. In certain embodiments, the transmission line 200 is anchored underneath a press ring at or near the leading face 302 of the pin end 102, as will be discussed in association with (PRIOR ART) FIGS. 39A through 39B. In such embodiments, a tension anchor 304, used to place tension on the transmission line 200, may be attached to the transmission line 200 using, for example, a flare, threads, a crimp and sleeve, a crimp and threads, and/or the like. These different types of tension anchors 304 will be discussed in association with (PRIOR ART) FIGS. 25A through 26B.

In other embodiments, the transmission line 200 is anchored deeper within the drill string component 100, as will be discussed in association with (PRIOR ART) FIGS. 29A through 43. In such embodiments, a tension anchor 304 may be attached to the transmission line 200 using, for example, a flare, threads, a crimp and sleeve, a crimp and threads, and/or the like, as shown in (PRIOR ART) FIGS. 25A through 26B. Various different configurations/techniques may be used to hold tension on the transmission line 200. For example, a tension anchor 304 may be pulled onto a flat surface to place tension on the transmission line 200, as will be discussed in association with (PRIOR ART) FIGS. 29A through 32B. Alternatively, a tension anchor 304 may be pulled onto an angled surface to place tension on the transmission line 200, as will be discussed in association with (PRIOR ART) FIGS. 33 through 36. In yet other embodiments, a threaded tensioner may be used to place tension on the transmission line 200, as will be discussed in association with (PRIOR ART) FIGS. 36 and 38. The design choices shown in (PRIOR ART) FIG. 24 are provided by way of example and not limitation. Other design choices are possible and within the scope of the invention.

Referring to (PRIOR ART) FIG. 25A, one embodiment of a tension anchor 304 is illustrated. In this embodiment, the tension anchor 304 is attached to a transmission line 200 using a flare. As shown, the transmission line 200 includes an outer armor 600 (e.g., metal tubing) that protects internal wiring 602 such as coaxial cable. An end 606 of the outer armor 600 may be machined and flared with a tool to retain a sleeve 604 on the end of the transmission line 200. The sleeve 604 may be slipped over the transmission line 200 prior to flaring the end 606. The sleeve 604 may rest against a shoulder 112 within the slot 110*a* to hold tension in the transmission line 200. A housing 608 (e.g., a mill-max housing 608) may be inserted into the flared end 606 of the outer armor 600 to connect to the internal wiring 602 of the transmission line 200. A cone element 610, such as a ceramic cone element 610, may be inserted into the flared end 606 to prevent the flared portion of the outer armor 600 from collapsing and pulling through the sleeve 604. This cone element 610 may have an internal bore to enable a conductive dagger element (not shown) of a transmission element 300 to pass through the internal bore to contact and connect to the housing 608, and thereby connect to the internal wiring 602.

Referring to (PRIOR ART) FIG. 25B, another embodiment of a tension anchor 304 is illustrated. In this embodiment, the tension anchor 304 is threaded onto the transmission line 200. More specifically, the outer armor 600 of the transmission line 200 includes external threads that mate with corresponding internal threads of a sleeve 604. A housing 612, 614, such as an insulated boot housing 612, 614, may enable a conductive dagger element (not shown) of a transmission element 300 to connect to the internal wiring 602. In the illustrated embodiment, the sleeve 604 includes a shoulder 616 that mates with a corresponding shoulder 112 in the slot 110*a* to hold tension in the transmission line 200. This embodiment of the tension anchor 304 is designed for anchoring under a press ring, although the tension anchor 304 may also be designed for deeper anchoring within the drill string component 100.

Referring to (PRIOR ART) FIG. 26A, another embodiment of a tension anchor 304 is illustrated. In this embodiment, the tension anchor 304 is crimped onto the transmission line 200. An outer sleeve 604 is initially slipped over the transmission line 200. An inner sleeve 700 is then slipped over the transmission line 200 and crimped onto the outer diameter of the transmission line 200. The outer sleeve 604 may then be slid toward the end of the transmission line 200 until it contacts the inner sleeve 700. In certain embodiments, a spacer 702 may be inserted between the outer sleeve 604 and the inner sleeve 700 to adjust the placement of the outer sleeve 604 relative to the transmission line 200. The length of the spacer may be adjusted to modify the placement.

A housing 612, 614, such as an insulated boot housing 612, 614, may enable a conductive dagger element (not shown) of a transmission element 300 to connect to the internal wiring 602 of the transmission line 200.

Referring to (PRIOR ART) FIG. 26B, another embodiment of a tension anchor 304 is illustrated. In this embodiment, the tension anchor 304 is crimped and threaded onto the transmission line 200. A sleeve 710 is initially slipped over the transmission line 200 and crimped onto the transmission line 200. This sleeve 710 is externally threaded on the end 712. An internally threaded second sleeve 714 is then screwed onto the sleeve 710. This second sleeve 714 may be used to cover and protect a housing 612, 614, such as an insulated boot housing 612, 614. The housing 612, 614 may enable a conductive dagger element (not shown) of a transmission element 300 to connect to the internal wiring 602 of the transmission line 200.

(PRIOR ART) FIG. 28 is an exploded view showing one embodiment of a transmission line retention system in accordance with the invention. The exploded view shown in (PRIOR ART) FIG. 27 is presented to show one example of a retention system in accordance with the invention and is not intended to be limiting.

In the illustrated embodiment, the retention system is anchored deep (i.e., below the press ring 800) in the drill string component 100. The illustrated embodiment also uses a crimped and threaded tension anchor 304 as discussed in association with (PRIOR ART) FIG. 26B. In addition, the tension anchor 304 utilizes a pair of angled surfaces that are oriented to keep the transmission line 200 retained within the slot 110*a* when tension is placed on the transmission line 200. Such an embodiment will be discussed in more detail in association with (PRIOR ART) FIGS. 33 through 36.

(PRIOR ART) FIG. 27 further shows a press ring 800 for insertion into the internal diameter 108 of the drill string component 100, and a transmission element 300 for transmitting signals across the tool joint. A conductive dagger element 804 extends from the transmission element 300 to the housing 612, 614. An insulated sheath 808 may surround the dagger element 804, and an outer protective sheath 810 (e.g., metal tubing) may surround the insulated sheath 808. Further shown are the sleeves 710, 714 as described in association with (PRIOR ART) FIG. 26B.

As shown in (PRIOR ART) FIG. 27, in certain embodiments, an end 812 of the sleeve 710 may be angled to contact a corresponding angle of an insert 806. This angled insert 806 may be placed within the slot 110*a* as will be explained in more detail in association with (PRIOR ART) FIGS. 33 through 36. The orientation of the angled surfaces may keep the transmission line 200 retained within the slot 110*a* when tension is placed on the transmission line 200.

(PRIOR ART) FIG. 28 is a cross-sectional view showing the retention system of (PRIOR ART) FIG. 27 assembled in the drill string component 100. Each of the components shown in (PRIOR ART) FIG. 27 are shown in (PRIOR ART) FIG. 28 with the same numbering. Notably, (PRIOR ART) FIG. 28 shows the angled insert 806 within the slot 110*a*. As shown in (PRIOR ART) FIG. 28, the angled insert 806 is retained within the slot 110*a* by overhanging material 900 (hereinafter referred to as an "overhang 900") over the angled insert 806. The angled insert 806 may be slid into the slot 110*a* beneath the overhang 900. The overhang 900 may be sized such that it allows the smaller diameter transmission line 200 to fit into the slot 110*a* while preventing the larger diameter angled insert 806 from exiting the slot 110*a*. A slot may be provided in the angled insert 806 to enable the transmission line 200 to be placed into the angled insert 806 as shown in (PRIOR ART) FIG. 27. As further shown in (PRIOR ART) FIG. 28, the orientation of the angles 902 of the insert 806 and sleeve 710 keep the transmission line 200 firmly retained within the slot 110*a* when tension is placed on the transmission line 200.

(PRIOR ART) FIGS. 29A through 32B show one embodiment of a transmission line retention system within a drill string component 100, and a method for installing the transmission line 200 in the drill string component 100. In this embodiment, the transmission line 200 is "anchored deep" and the transmission line retention system utilizes the crimped and threaded tension anchor 304 discussed in association with (PRIOR ART) FIG. 26B. As shown, a slot 110*a* is provided in the internal diameter 108 of the drill string component 100. This slot 110*a* includes an overhang 900 to retain the tension anchor 304 within the slot 110*a*.

As can be observed in (PRIOR ART) FIGS. 29A and 29B, (PRIOR ART) FIG. 29A is a perspective view of (PRIOR ART) FIG. 29B, the transmission line 200 and tension anchor 304 being initially provided in a relaxed state. In this state, the tension anchor 304 is not able to pass over the overhang 900 and slide into the slot 110*a* (assuming a tension anchor 304 at the other end of the transmission line 200 is already installed into the slot 110*b*).

In order to move the tension anchor 304 past the overhang 900, the transmission line 200 may be stretched (i.e., placed under tension). This stretching may be performed without breaking or permanently deforming the transmission line 200. For example, a thirty-four foot transmission line 200 (with metal outer armor 600) may be stretched on the order of an inch without breaking or permanently deforming the transmission line 200.

As can be observed in (PRIOR ART) FIGS. 30A and 30B, the transmission line 200 and tension anchor 304 may be stretched so that the rear portion 1002 of the tension anchor 304 moves beyond the overhang 900. In certain embodiments, a tool may be attached to an end 1004 of the tension anchor 304, such as by screwing the tool into the internal threads 1004 of the tension anchor 304, to stretch and place tension on the transmission line 200.

As can be observed in (PRIOR ART) FIGS. 31A and 31B, once past the overhang 900, the tension anchor 304 and transmission line 200 may be inserted into the slot 110*a*. Once in the slot 110*a*, the tension anchor 304 may be released. The tension in the transmission line 200 may then pull the tension anchor 304 into the void between the overhang 900 and the slot 110*a*, as shown in (PRIOR ART) FIGS. 32A and 32B. Because the tension anchor 304 is trapped below the overhang 900, the tension anchor 304 cannot leave the slot 110*a*, thereby securing the end of the transmission line 200.

As shown in (PRIOR ART) FIGS. 29A through 32B, in certain embodiments, the mating surfaces 1000, 1002 between the tension anchor 304 and the slot 110*a* are roughly perpendicular to the transmission line 200. This configuration is anchored deep and "pulled onto [a] flat," as set forth in (PRIOR ART) FIG. 26, since the tension anchor 304 is pulled onto a "flat" (i.e., perpendicular) surface. Because of the overhang 900, the tension anchor 304 is retained within the slot 110*a* until tension is released in the transmission line 200.

(PRIOR ART) FIGS. 33 through 36 show another embodiment of a transmission line retention system within a drill string component 100, and a method for installing the transmission line 200 in the drill string component 100. In this embodiment, the transmission line 200 is anchored deep and "pulled onto [an] angle" as set forth in (PRIOR ART) FIG. 24 of the patent application.

For example, referring to (PRIOR ART) FIG. 33, in certain embodiments, an angled insert 806 may be placed into the slot 110*a* under the overhang 900. Because the angled insert 806 is placed under the overhang 900, the angled insert 806 may be retained in the slot 110*a*. Alternatively, the angled insert 806 may be permanently attached to the internal diameter 108 of the drill string component 100 or a shape similar to the angled insert 806 may be milled into the internal diameter 108 of the drill string component 100. As shown in (PRIOR ART) FIG. 33, the angled surface 1400 may be oriented such as to keep the transmission line 200 retained within the slot 110*a* when tension is placed on the transmission line 200.

Referring to (PRIOR ART) FIG. 34, in order to anchor a transmission line 200 to the end of the drill string component 100, the tension anchor 304 of a transmission line 200 may be initially brought into proximity of the angled insert 806. Tension may then be placed on the tension anchor 304 and transmission line 200 to move an end 1500 the tension anchor 304 past the angled insert 806 (i.e., towards the end of the drill string component 100), as shown in (PRIOR ART) FIG. 35.

When the tension anchor 304 is past the angled insert 806, the tension anchor 304 may be moved into the slot 110*a* and the tension in the transmission line 200 may be released. This may enable the angled surface 1500 of the tension anchor 304 to come into contact with the angled surface 1400 of the insert 806. Due to the orientation of the angled surfaces 1400, 1500, the tension anchor 304 and transmission line 200 are pulled into the slot 110*a* (i.e., toward the wall of the drill string component 100) as tension is placed on the transmission line 200. In other words, the tension anchor 304 will be urged in the direction of the wall 1700 of the drill string component 100, thereby keeping the tension anchor 304 and transmission line 200 within the slot 110*a*.

(PRIOR ART) FIGS. 37 and 38 show another embodiment of a transmission line retention system within a drill string component 100, and a method for installing the transmission line 200 in the drill string component 100. In this embodiment, the tension anchor 304 is anchored deep and "pulled onto a flat" as discussed in association with (PRIOR ART) FIG. 24 of the disclosure. After being pulled onto the flat, the tension anchor 304 is then adjusted to increase tension in the transmission line 200.

For example, referring to (PRIOR ART) FIG. 38, a tension anchor 304 attached to a transmission line 200 may initially be inserted into the slot 110*a*. In this example, the slot 110*a* includes an overhang 900 and the mating surfaces 1000, 1002 are perpendicular to the transmission line 200. Furthermore, in this embodiment, the tension anchor 304 includes two components 1800*a*, 1800*b* that are threaded together. After placing the transmission line 200 and tension anchor 304 into the slot 110*a*, the first component 1800*a* of the tension anchor 304 may be rotated relative to the second component 1800*b* using a tool. Due to the threaded connection, this may cause the first component 1800*a* (which is attached to the end of the transmission line 200) to move towards the pin end 102 of the drill string component 100, thereby adding tension to the transmission line 200. This rotation may continue until a desired amount of tension is placed on the transmission line 200, as shown in (PRIOR ART) FIG. 38. To release tension in the transmission line 200, the first component 1800*a* may be rotated in the opposite direction relative to the second component 1800*b*.

(PRIOR ART) FIGS. 39A through 43B show another embodiment of a transmission line retention system within a drill string component 100, and a method for installing the transmission line 200 in the drill string component 100. In this embodiment, the tension anchor 304 is anchored beneath a press ring 800 installed in the end of the drill string component 100.

Referring to (PRIOR ART) FIGS. 39A and 39B, as shown, in certain embodiments, a shoulder 2000 may be incorporated into a slot 110*a* in the drill string component 100. In certain embodiments, this shoulder 2000 may be located at or near the end of the drill string component 100.

Referring to (PRIOR ART) FIGS. 40A and 40B, a tension anchor 304 and associated transmission line 200 may then be placed in the slot 110*a*. A shoulder 2100 on the tension anchor 304 604 may be aligned with the corresponding shoulder 2000 in the slot 110*a*. In certain embodiments, tension may be placed on the tension anchor 304 and transmission line 200 to align the shoulders 2000, 2100.

Referring to (PRIOR ART) FIGS. 41A and 41B, once the shoulder 2100 of the tension anchor 304 is aligned with the shoulder 2000 of the slot 110*a*, the tension anchor 304 and transmission line 200 may be placed in the slot 110*a*. Tension in the transmission line 200 may then be released to allow the shoulder 2100 of the tension anchor 304 to seat against the shoulder 2000 of the slot 110*a*, as shown in (PRIOR ART) FIGS. 42A and 42B. Once the shoulder 2100 of the tension anchor 304 is seated against the shoulder 2000 of the slot 110*a*, a press ring 800 may be placed in the internal diameter 108 of the drill string component 100. This press ring 800 may keep the tension anchor 304 with the slot 110*a*, thereby ensuring tension is maintained in the transmission line 200. To release tension in the transmission line 200, the press ring 800 may be removed and the tension anchor 304 may be removed from the slot 110*a*.

Referring to (PRIOR ART) FIG. 44 is a cross-section diagram view of an inductive coupler taken from the '575 reference. The inductive coupler, or portions thereof, may be applicable to the teaching of the present application. A detailed description of the inductive coupler may be found in the '575 reference.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A bipartite inductive coupler assembly, comprising:

a downhole tool comprising an axial bore comprising a bore wall;

the axial bore wall comprising a first annular groove open to the bore;

a first elongate cylinder comprising an outside wall and an inside wall separated by a top and bottom wall, the bottom wall forming a first interfacial surface;

a second elongate cylinder comprising an outside wall and inside wall separated by a top and bottom wall, the top wall forming a second interfacial surface adjacent to the first interfacial surface;

the top wall of the first elongate cylinder comprising an annular recess configured to house an inductive coupler assembly;

the outside wall of the second elongate cylinder comprising a second annular groove open to the bore configured to align with the first annular groove, and an annular spring ring compressed within the second annular groove such that when the first annular groove and the second annular groove are aligned within the bore, the spring ring at least partially expands radially into the first annular groove, securing the elongate cylinder within the axial bore, and wherein the second elongate cylinder is press fit into the axial bore and the first elongate cylinder is slip fit into the axial bore adjacent the second elongate cylinder.

2. The bipartite inductive coupler assembly of claim 1, wherein the first elongate cylinder and the second elongate cylinder are separated by an annular gasket between the interfacial surface of the first elongate cylinder and the interfacial surface of the second elongate cylinder.

3. The bipartite inductive coupler assembly of claim 1, wherein the respective interfacial surfaces comprise a corresponding linear configuration.

4. The bipartite inductive coupler assembly of claim 1, wherein the respective interfacial surfaces comprise a corresponding non-linear configuration.

5. The bipartite inductive coupler assembly of claim 4, wherein the respective interfacial surfaces comprise a corresponding conical configuration.

6. The bipartite inductive coupler assembly of claim 4, wherein the respective interfacial surfaces comprise a corresponding wave configuration.

7. The bipartite inductive coupler assembly of claim 4, wherein the respective interfacial surfaces comprise grooves and ridges.

8. The bipartite inductive coupler assembly of claim 1, wherein the inductive coupler assembly comprises an MCEI channel housing an electrical conductor comprising a ground end and a transmission end.

9. The bipartite inductive coupler assembly of claim 8, wherein the transmission end is in communication with electrical equipment within the downhole tool.

10. The bipartite inductive coupler assembly of claim 8, wherein the transmission end is in communication with an inductive coupler assembly at the opposite end of the downhole tool.

11. The bipartite inductive coupler assembly of claim 8, wherein the MCEI channel is embedded within a polymer comprising MCEI particles.

12. The bipartite inductive coupler assembly of claim 8, wherein the MCEI channel is perforated.

13. The bipartite inductive coupler assembly of claim 1, wherein the axial bore wall is within a threaded pin end tool joint of a downhole tool comprising a drill pipe.

14. The bipartite inductive coupler assembly of claim 13, wherein the first annular groove is located in the axial bore wall opposite threads 2 through 5 of the pin end tool joint.

15. The bipartite inductive coupler assembly of claim 1, wherein the axial bore wall is adjacent an internal shoulder within a threaded box end tool joint of a drill pipe.

16. The bipartite inductive coupler assembly of claim 15, wherein the first annular groove is located within the axial bore wall of the threaded box end tool joint between 0.75 and 5.5 inches from the internal shoulder.

17. The bipartite inductive coupler assembly of claim 1, wherein the second elongate cylinder comprises one or more annular seals between the outside wall of the cylinder and the axial bore wall.

18. The bipartite inductive coupler assembly of claim 1, wherein the first interfacial surface and the second interfacial surface do not correspond with each other.

19. The bipartite inductive coupler assembly of claim 1, wherein the first elongate cylinder comprises an anti-rotation lock intersecting the bore wall and the outside wall of the first elongate cylinder.

* * * * *